US011436970B2

(12) United States Patent
Gray et al.

(10) Patent No.: US 11,436,970 B2
(45) Date of Patent: Sep. 6, 2022

(54) ADDRESSING AND REDUNDANCY SCHEMES FOR DISTRIBUTED DRIVER CIRCUITS IN A DISPLAY DEVICE

(71) Applicant: Huayuan Semiconductor (Shenzhen) Limited Company, Shenzhen (CN)

(72) Inventors: Richard Landry Gray, Taipei (TW); Chih-Chang Wei, Taoyuan (TW); Junjie Zheng, Cupertino, CA (US)

(73) Assignee: Huayuan Semiconductor (Shenzhen) Limited Company, Shenzhen (CN)

( * ) Notice: Subject to any disclaimer, the term of this patent is extended or adjusted under 35 U.S.C. 154(b) by 0 days.

(21) Appl. No.: 17/149,210

(22) Filed: Jan. 14, 2021

(65) Prior Publication Data

US 2022/0020310 A1 Jan. 20, 2022

Related U.S. Application Data

(60) Provisional application No. 63/052,844, filed on Jul. 16, 2020.

(51) Int. Cl.

| | |
|---|---|
| ***G09G 3/20*** | (2006.01) |
| ***G06F 3/038*** | (2013.01) |
| ***G09G 5/00*** | (2006.01) |
| ***G09G 3/32*** | (2016.01) |
| *G09G 5/10* | (2006.01) |

(52) U.S. Cl.

CPC ............. *G09G 3/2085* (2013.01); *G09G 3/32* (2013.01); *G09G 5/10* (2013.01); *G09G 2310/0275* (2013.01)

(58) Field of Classification Search

CPC ..................... G09G 2300/0426; G09G 3/3266

See application file for complete search history.

(56) References Cited

U.S. PATENT DOCUMENTS

| | | | | |
|---|---|---|---|---|
| 10,909,911 | B1 | 2/2021 | Zheng et al. | |
| 11,211,001 | B2 | 12/2021 | Wei et al. | |
| 2008/0122832 | A1* | 5/2008 | Chen ........................ | G09G 3/32 345/214 |
| 2008/0136769 | A1 | 6/2008 | Kim et al. | |
| 2010/0309100 | A1 | 12/2010 | Cok et al. | |
| 2011/0109228 | A1 | 5/2011 | Shimomura et al. | |
| 2011/0148825 | A1* | 6/2011 | Ueno ..................... | G09G 3/006 345/204 |
| 2012/0050343 | A1 | 3/2012 | Kim et al. | |
| 2018/0286300 | A1* | 10/2018 | Vahid Far ............ | G11C 19/287 |
| 2020/0082751 | A1 | 3/2020 | Wu et al. | |
| 2020/0312220 | A1 | 10/2020 | Hussell et al. | |

(Continued)

OTHER PUBLICATIONS

Non-Final Office Action, U.S. Appl. No. 17/149,402, dated Feb. 15, 2022, 23 pages.

*Primary Examiner* — Nan-Ying Yang

(74) *Attorney, Agent, or Firm* — Zhu Lehnhoff LLP

(57) ABSTRACT

Embodiments relate to a display device that includes a control circuit, an array of light emitting diode (LED) zones, and an array of zone integrated circuits that are distributed in the display area. The zone integrated circuits may comprise integrated a LED, driver circuits, and at least one redundant driver circuit. A non-operational driver circuit is bypassed, and the LED driving responsibility is assumed by the neighboring driver circuit. The neighboring driver circuit may be another one of the driver circuits or the redundant driver circuit.

21 Claims, 17 Drawing Sheets

(56) References Cited

U.S. PATENT DOCUMENTS

| | | | |
|---|---|---|---|
| 2021/0366369 | A1 | 11/2021 | Wei et al. |
| 2021/0366374 | A1 | 11/2021 | Wei et al. |
| 2021/0366391 | A1 | 11/2021 | Wei et al. |

* cited by examiner

ADDRESSING AND REDUNDANCY SCHEMES FOR DISTRIBUTED DRIVER CIRCUITS IN A DISPLAY DEVICE

CROSS-REFERENCE TO RELATED APPLICATIONS

This application claims the benefit of U.S. Provisional Application No. 63/052,844 filed Jul. 16, 2020, which is hereby incorporated by reference in its entirety.

BACKGROUND

This disclosure relates generally to light emitting diodes (LEDs) and LED driver circuitry for a display, and more specifically to a display architecture with distributed driver circuits.

LEDs are used in many electronic display devices, such as televisions, computer monitors, laptop computers, tablets, smartphones, projection systems, and head-mounted devices. Modern displays may include large numbers of individual LEDs that may be arranged in rows and columns in a display area. In order to drive each LED, current methods employ driver circuitry that requires significant amounts of external chip area that impacts the size of the display device.

SUMMARY

In one embodiment, a display device comprises an array of light emitting diode zones each comprising one or more light emitting diodes that generate light in response to respective driver currents, a control circuit to generate driver control signals and address signals, and a group of driver circuits including a plurality of driver circuits. Each driver circuit in the group is configured to drive a respective light emitting diode zone from the array of light emitting zones by controlling a respective driver current responsive to all of the plurality of driver circuits operating in a first mode. Responsive to a first driver circuit from the plurality of driver circuits having a fault condition, a second driver circuit included in the plurality of driver circuits is switched to a second mode during which the second driver circuit is reconfigured to drive the faulty first driver circuit's respective light emitting diode zone.

In one embodiment, a driver circuit for a display device comprises a control logic to operate in a first mode responsive to all previous driver circuits in a group of driver circuits operating in the first mode, or operate in a second mode responsive to a previous driver circuit in the group having a fault condition. In the first mode the driver circuit is configured to drive a first light emitting diode zone included in an array of light emitting diode zones. In the second mode the driver circuit is reconfigured to drive a second light emitting diode zone that is adjacent to the first light emitting diode zone in the array.

BRIEF DESCRIPTION OF THE DRAWINGS

The teachings of the embodiments of the present invention can be readily understood by considering the following detailed description in conjunction with the accompanying drawings.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive aspect matter.

DETAILED DESCRIPTION OF EMBODIMENTS

Embodiments herein relate to a display device that includes an LED and driver circuit. The LED and driver circuit may be integrated into a single package or may be distributed across separate packages in one embodiment. More specifically, the embodiments are related to fault tolerant schemes for the LED and driver circuit. The fault tolerant schemes reduce failure of operational algorithms used to address and drive LED drivers included in the display device due to a single fault on one display driver. As will be described in further detail below, the display device includes one or more redundant LED drivers that may be automatically activated responsive to a fault in one of the LED drivers causing one of the LED drivers to be non-operational thereby reducing the likelihood of failure of the display device.

Figure 1A:
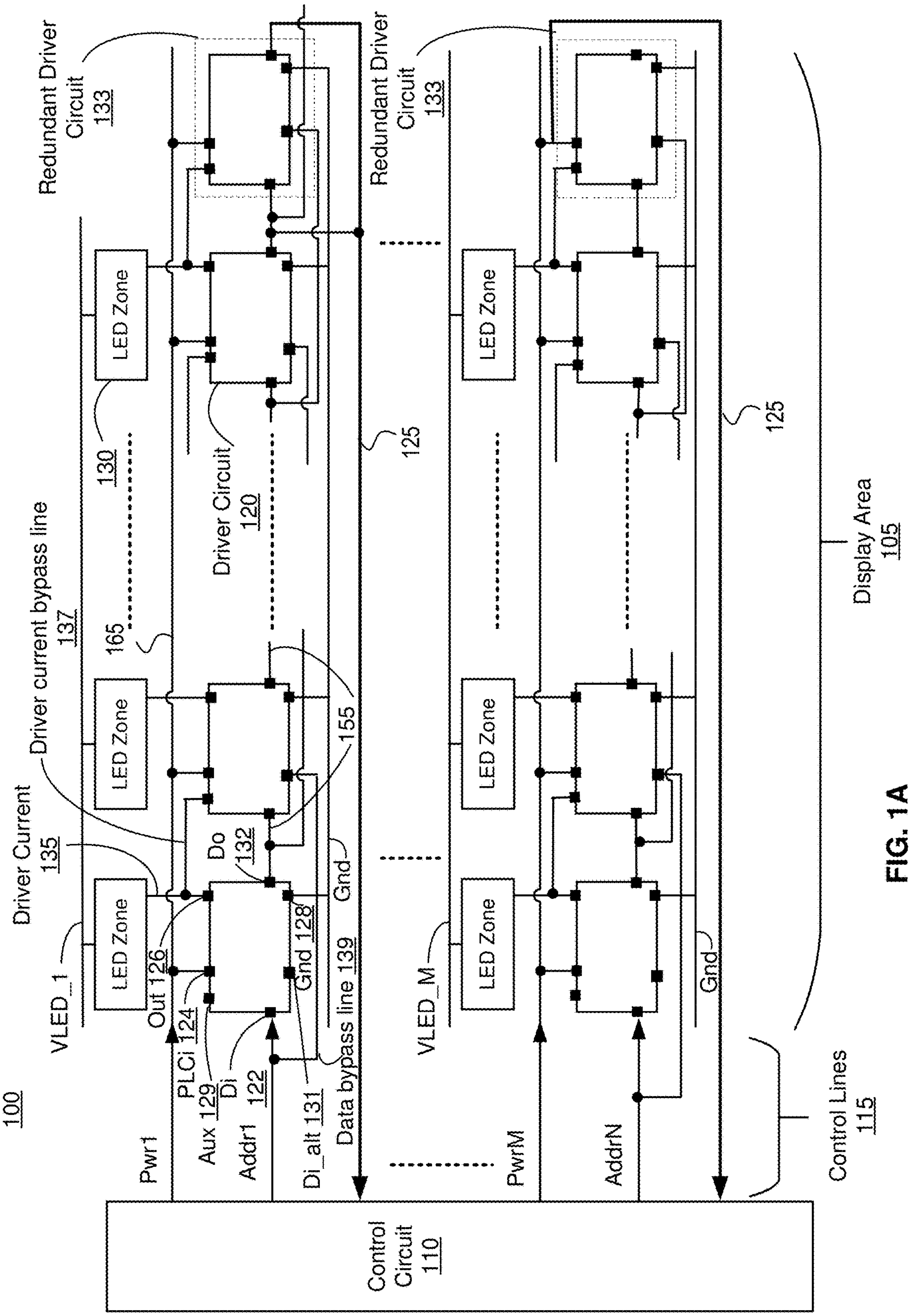
FIG. 1A is a circuit diagram of a display device, according to one embodiment.

FIG. 1A is a circuit diagram of a display device 100 for displaying images or video, according to one embodiment. In various embodiments, the display device 100 may be implemented in any suitable form-factor, including a display screen for a computer display panel, a television, a mobile device, a billboard, etc. The display device 100 may comprise a liquid crystal display (LCD) device or an LED display device. In an LCD display device, LEDs provide white light backlighting that passes through liquid crystal color filters that control the color of individual pixels of the display. In an LED display device, LEDs are directly controlled to emit colored light corresponding to each pixel of the display. The display device 100 may include a display area 105, driver control lines 115, and a control circuit 110. In various embodiments, the display device 100 may include additional, fewer, or different components.

The display area 105 comprises an array of pixels for displaying images based on data received from the control circuit 110. In various embodiments, the display area 105 may include LED zones 130, a set of distributed driver circuits 120, power supply lines including VLED lines (e.g., VLED_1, . . . VLED_M), and ground (GND) lines, and various signaling lines (e.g., a set of serial communication lines 155 connecting adjacent driver circuits 120 and power communication lines Pwr). In various embodiments, the display area 105 may include additional, fewer, or different components. The VLED lines provide power to the LED zones 130 (e.g., by supplying power to the anode of the LEDs in the LED zones 130, or of the anode side of a series connected string of LEDs). The GND lines provide a path to ground for the LED zones 130 and the driver circuits 120.

As will be described in further detail below, the display area 105 may be physically structured such that the LED zones 130 are stacked over the driver circuits 120. In other words, an array of LED zones 130 are arranged in a first x-y plane and an array of driver circuits 120 are arranged in a second x-y plane parallel to the first x-y plane. In one configuration, each LED zone 130 is stacked over (i.e., in the z direction) the corresponding driver circuit 120 that drives it. Furthermore, the components of the display area 105 (e.g., the LED zones 130 and the driver circuits 120) may be integrated on the same substrate and in a same package as further described in FIGS. 3A-3C. This structure enables a display device 100 in which the driver circuits 120 are distributed in the display area 105 and therefore enables a more compact display device 100 than in devices where the driver circuits 120 are external to the display area 105.

The LED zones 130 may be arranged in a two-dimensional array (e.g., in rows and columns). The LED zones 130 each comprise one or more LEDs that each generate light that has a brightness dependent on its respective driver currents 135. In an LCD display, an LED zone 130 may comprise one or more LEDs that provides backlighting for a backlighting zone, which may include a one-dimensional or two-dimensional array of pixels. In an LED display, the LED zone 130 may comprise one or more LEDs corresponding to a single pixel of the display device 100 or may comprise a one-dimensional array or two-dimensional array of LEDs corresponding to an array of pixels (e.g., one or more columns or rows). For example, in one embodiment, the LED zone 130 may comprise one or more groups of red, green, and blue LEDs that each correspond to a sub-pixel of a pixel. In another embodiment, the LED zone 130 may comprise one or more groups of red, green, and blue LED strings that correspond to a column or partial column of sub-pixels or a row or partial row of sub-pixels. For example, an LED zone 130 may comprise a set of red sub-pixels, a set of green sub-pixels, or a set of blue sub-pixels.

The LEDs may be organic light emitting diodes (OLEDs), inorganic light emitting diodes (ILEDs), mini light emitting diodes (mini-LEDs) (e.g., having a size range between 100 to 300 micrometers), micro light emitting diodes (micro-LEDs) (e.g., having a size of less than 100 micrometers), white light emitting diodes (WLEDs), active-matrix OLEDs (AMOLEDs), transparent OLEDs (TOLEDs), or some other type of LEDs.

The driver circuits 120 drive the LED zones 130 by controlling the respective driver currents 135 to the LED zones 130 in response to driver control signals. In one embodiment, the driver circuits 120 are distributed in the display area 105 and arranged in a two-dimensional array (e.g., in rows and columns) in correspondence with the LED zones 130. In an embodiment, a driver circuit 120 controls a driver current 135 supplied by VLED via an output pin 126 to control brightness of one LED zone 130 based on the driver control signals. For example, brightness of the LED zone 130 generally increases with increasing driver current 135.

In an embodiment, the driver circuits 120 and corresponding LED zones 130 may be arranged in groups that share a common set of driver control lines 115, VLED lines, and GND lines. For example, the driver circuits 120 within a group are coupled to a common power communication line Pwr and are each indirectly controlled by a common address communication line Addr (as will be described in further detail below). In an example embodiment, the driver circuits 120 in one group are daisy-chained together via a set of address communication lines that couple adjacent driver circuits 120 (e.g., from the data output pin 132 of one driver circuit 120 to a data input pin 122 of the next driver circuit 120).

In the illustrated embodiment of FIG. 1A, each row of the display device 100 corresponds to a group of driver circuits 120 that shares common driver control lines 115, VLED lines, and GND lines. In other embodiments, a group of driver circuits 120 may correspond to a partial row of the display area 105 or a full or partial column of the display area 105. In another embodiment, a group of driver circuits 120 may correspond to a block of adjacent driver circuits 120 that may span multiple rows and columns.

The driver circuits 120 may operate in various modes including at least an addressing mode, a configuration mode, an operational mode, and a non-operational mode. During the addressing mode, the control circuit 110 assigns a unique address to each of the driver circuits 120 within a group that is utilized to broadcast further commands and data in the configuration and operational modes. During the configuration mode, the control circuit 110 configures the driver circuits 120 with one or more operating parameters (e.g., overcurrent thresholds, overvoltage thresholds, clock division ratios, and/or slew rate control). During the operational mode, the control circuit 110 provides control data to the driver circuits 120 that causes the driver circuits 120 to control the respective driver currents 135 to the LED zones 130, thereby controlling brightness. During the non-operational mode of a driver circuit 120, the control circuit 110 still provides the control data to the non-operational driver circuit 120, but the non-operational driver circuit 120 is effectively disabled, as will be described below. In other embodiments, the modes of operation of the display device 100 may include additional, fewer, or different modes of operation. For example, the modes of operation may include an initialization mode and an off mode.

In one embodiment, each driver circuit 120 includes a seven-pin configuration as shown in FIG. 1A. The seven-pin configuration of the driver circuit 220 may include a data input pin (Di) 122, a power line communication input pin (PLCi) 124, an output pin (Out) 126, a ground pin (Gnd)

128, an auxiliary pin (Aux) 129, an alternate data input pin (Di_alt) 131, and data output pin (Do) 132. In an embodiment, the output pin 126 may comprise a set of multiple pins to control multiple channels of the LED zone 130. For example, the output pin 126 may include 3 pins to control red, green, and blue channels of the LED zones 130.

The ground pin 128 is configured to provide a path to a ground line for the driver circuit 120, which may be common to the corresponding LED zone 130.

The power line communication input pin 124 is configured to receive a power line communication signal from the control circuit 110 via the common power communication lines (e.g., Pwr1, Pwr2, . . . PwrM) for each group. The power line communication signal includes a supply voltage that may be modulated to encode the driver control signal or other control information as digital data. For example, the power line communication signal may encode operating parameter information or control data information for operating the driver circuit 120.

Figure 1B:
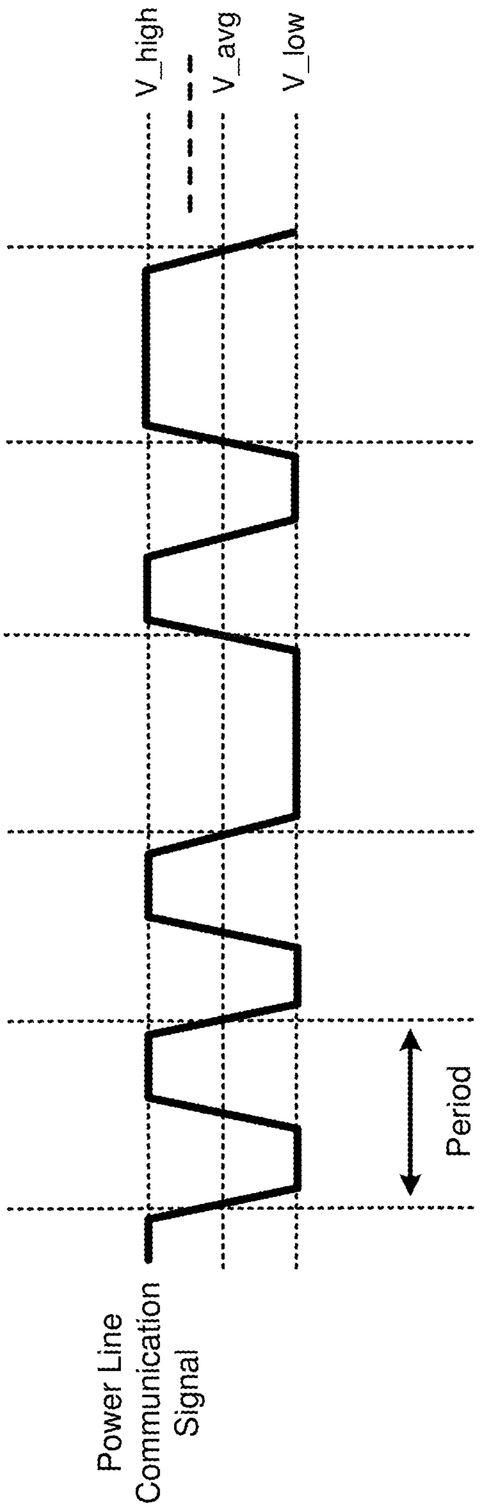
FIG. 1B is a waveform diagram illustrating an example waveform of a power line communication signal, according to one embodiment.
Figure 1C:
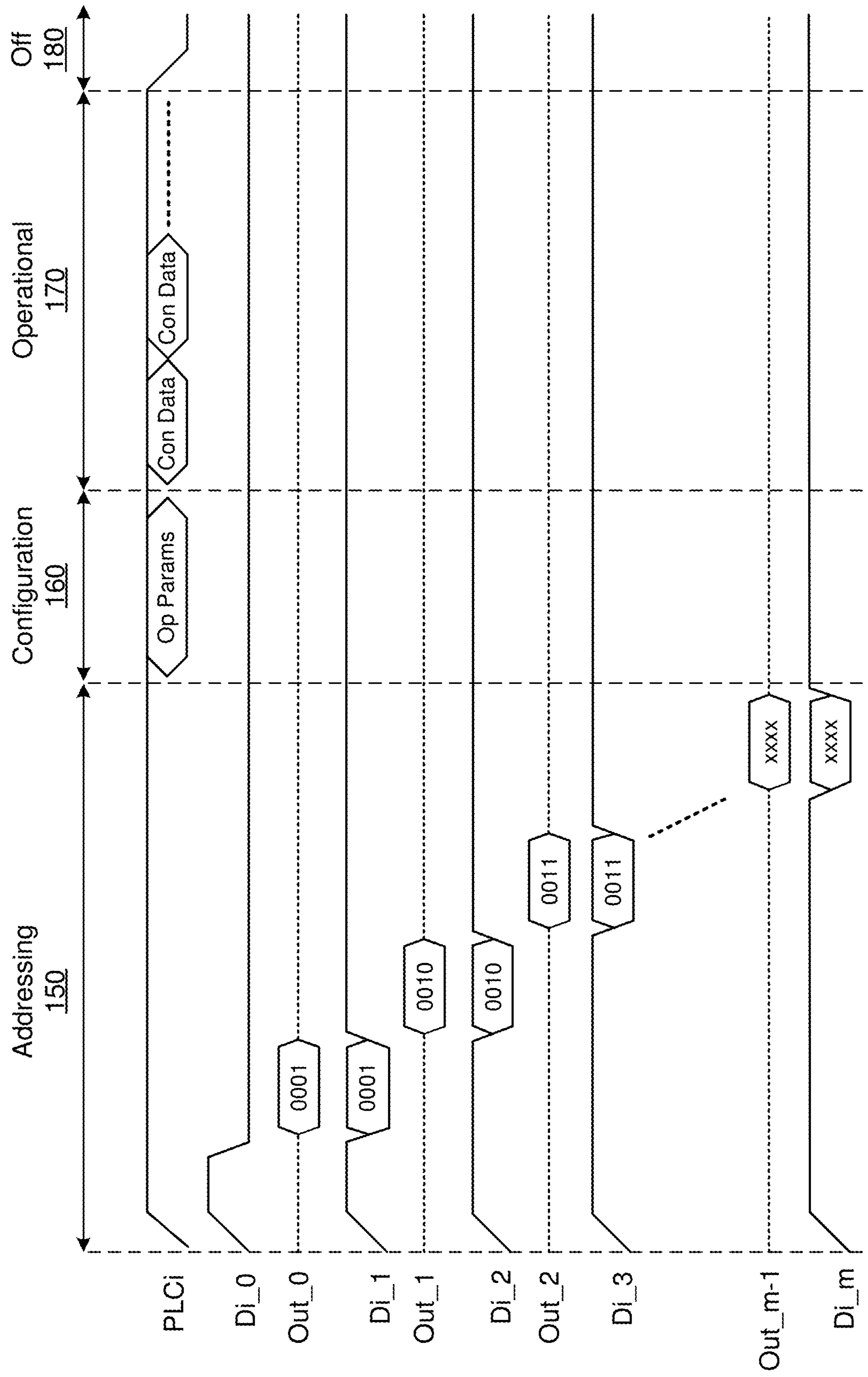
FIG. 1C is a waveform diagram illustrating the operational modes of the display device, according to one embodiment.

Specifically, during the configuration mode, the power line communication signal provides as digital data, one or more operating parameters (e.g., various overcurrent thresholds or overvoltage thresholds to protect the LEDs from overstress, different clock division ratios, and slew rate control of the driver current 135). During the operational mode, the power line communication signal provides control data (e.g., brightness control information) for the LED zones 130. The brightness control information may include one or more address words to identify a driver circuit 120 within a group of the driver circuits 120 and one or more data words for controlling brightness of the LED zone 130 by controlling the driver current 135 of the identified driver circuit 120. FIGS. 1B and 1C provide example waveforms associated with the power line communication signal. In some embodiments, the power line communication signal supplies a direct current voltage between 3 and 12 volts for the supply voltage. In one embodiment, the power line communication signal may provide a power supply voltage of more than 4.5 volts with a digital data signal having a maximum data rate of up to 2 megahertz (MHz) with a 0.5 peak-to-peak voltage signal.

In other embodiments, the power line communication pin 124 may be replaced with a dedicated pin for receiving a voltage that powers the driver circuit 120 and the driver circuit 120 may further include a dedicated command pin for receiving command data. The dedicated command pin may be coupled to a single wire or a multiple wire bus. The command data received at the dedicated command pin can be differential/single-ended data, and can optionally include a differential or single-ended clock.

The data input pin 122 of the first driver circuit 120 in a group is connected to one of the common address communication lines (e.g., Addr1, Addr2, . . . AddrN). The data input pin 122 and the data output pin 132 of all other driver circuits 120 in the group are coupled to the serial communication lines 155 to facilitate serial communication to and from the driver circuits 120. The data input pin 122 is used in the addressing mode to receive an incoming addressing signal via one of the common address communication lines (e.g., Addr1, Addr2, . . . AddrN) from the control circuit 110 (in the case of the first driver circuit 120 in each group) or via one of the serial communication lines 155 coupling adjacent driver circuits 120 (in the case of remaining driver circuits 120 in each group not directly coupled to the control circuit 110). The incoming addressing signal may be a digital signal that controls an address of each respective driver circuit 120 as will be described in further detail below.

In one embodiment, the data input pins 122 of the driver circuits 120 may receive commands rather than the commands being received at the power line communication pin 124. An example of a command received at the data input pins 122 include readback commands as further described below.

The first driver circuit 120 in each group stores an address based on the incoming addressing signal and generates an outgoing addressing signal for outputting via the data output pin 132. For example, the driver circuit 120 may receive an address, store the address, and increment the address by 1 or by another fixed amount and send the incremented address as an outgoing addressing signal to the data input pin 122 of the next driver circuit 120 in the group. Alternatively, the driver circuit 120 may receive the address of the prior driver circuit, increment the address, store the incremented address, and send the incremented address to the next driver circuit. In another embodiment, the driver circuit 120 may generate an address based on the incoming address signal according to a different function. Waveforms illustrating the addressing scheme are described in further detail in FIG. 1C.

In the operational mode of the display device 100, the output pin 126 is coupled to sink current from a corresponding LED zone 130 to control supply of the driver current 135. The driver circuit 120 controls the driver current 135 supplied by VLED via the output pin 126 to control brightness of one LED zone 130 based on the driver control signals. For example, brightness of the LED zone 130 generally increases with increasing driver current 135. In one embodiment, the driver circuit 120 includes more than one output pin 126 as mentioned above. For example, in an LED display, the LED zone 130 may comprise three or more LEDs or LED strings corresponding to three sub-pixels (e.g., a red sub-pixel, a green sub-pixel, and a blue sub-pixel), and the driver circuit 120 may include three output pins 126, one for each color channel. In one embodiment, a readback line 125 may couple the last operational driver circuit 120 in each group to the control circuit 110. In one embodiment, the readback line 125 is also connected to the redundant driver circuit 133. The control circuit 110 may issue commands to driver circuits 120 during the operational mode to request readback data (e.g., sensor data), and the driver circuits 120 provide the requested readback data to the control circuit 110 in response to the commands. In response to a readback command, a targeted driver circuit 120 may transmit the requested readback data to the control circuit 150 via the serial communication lines 155. For example, upon receiving a command, a targeted driver circuit 120 outputs the readback data to an adjacent driver circuit 120 via the serial communication lines 155. Each subsequent driver circuit 120 receives the readback data and propagates it to the next driver circuit 120 in the serial chain until it reaches the control circuit 110. Based on the readback data received from the driver circuits 120, the control circuit 110 may detect that one or more of the driver circuits 120 is non-operational (e.g., faulty).

In one embodiment, each driver circuit 120 includes the auxiliary pin 129 and the alternate data input pin 131. The auxiliary pin 129 of each driver circuit 120 in a group (except for the first driver circuit 120 in the group) is connected to the output pin 126 of a previous driver circuit 120 that is immediately adjacent to the driver circuit 120 in the group as well as the previous driver circuit's LED zone 130 via a driver current bypass line 137. The driver current bypass lines 137 allow for any of the driver circuits 120 to be bypassed if they become non-operational such that the LED driving responsibility of the bypassed LED driver is shifted to another one of the LED drivers 120 as will be described below.

Similarly, the alternate data input pin 131 of each driver circuit 120 (except for the first driver circuit 120 in the group) is connected to the data input pin 122 of a previous driver circuit 120 that is immediately adjacent to the driver circuit 120 in the group via a data bypass line 139. The data bypass lines 139 allow for any of the driver circuits 120 to be bypassed if they become non-operational such that addressing signals received by the bypassed LED driver are routed to another one of the LED drivers 120 as will be described below. In one embodiment, the auxiliary pin 129 and the alternate data input pin 131 are redundant connections that are used to enable bypassing of driver circuits 120 that are determined to be non-operational due to having faulty addressing functionality, for example.

In one embodiment, each LED zone 130 has the option of being driven by its neighboring driver circuit 120. Each group of drivers (e.g., a row) may include one or more redundant driver circuits 133 at certain intervals along the group (e.g., at the end of the row or at multiple intervals). Redundant driver circuits 133 do not have a dedicated LED zone that they are responsible for driving unlike the remaining driver circuits 120. Under ideal circumstances where all of the driver circuits 120 are operational (e.g., no faults in any of the driver circuits 120), the redundant driver circuits 133 remain unused. However, in the event of a fault of one of the driver circuits 120 that results in the driver circuit 120 becoming non-operational, the non-operational driver circuit is bypassed, and its LED driving responsibility is taken up by its neighboring driver circuit coupled to its output pin 126 via the driver current bypass line 137. In one embodiment, the neighboring driver circuit of a given driver circuit is the driver circuit that is immediately after the given driver circuit in the group (e.g., the driver circuit 120 to the right in FIG. 1A). The neighboring driver circuit in turn has its corresponding LED zone driven by its neighboring driver circuit, and so on, until finally the redundant driver circuit 133 is utilized, as will be further described below.

FIG. 1B is a waveform diagram illustrating an example waveform of a power line communication signal, according to one embodiment. The power line communication signal switches between high data voltages V_high and low data voltages V_low to encode the digital data (e.g., operating parameters or brightness control information) that results in an average voltage of approximately V_avg. In one example embodiment, the high data voltage V_high is 5.5 volts, the low data voltage V_low is 4.5 volts, and the average voltage V_avg is 5 volts. The digital data may be encoded using biphase mark code encoding. In this encoding scheme, logic values are represented by the presence or absence of transitions in each period. For example, periods including a transition may represent logic high values and periods without transitions may represent logic low values. Furthermore, in this encoding, the signal also transitions between logic levels in between each period. This encoding scheme beneficially ensures that the power line communication signal maintains an average voltage V_avg very close to the midpoint between the logic levels in order to provide a relatively stable direct current supply voltage that can be extracted from the power line communication signal to power the driver circuits 120. Another advantage of this scheme is that it does not require a separate clock signal and can be implemented on a single wire.

FIG. 1C is a waveform diagram illustrating the operational modes of the display device 100, according to one embodiment. The three modes of operation (i.e., the addressing mode 150, the configuration mode 160, and the operational mode 170) of the display device 100 are depicted along with an off mode 180. FIG. 1C illustrates the power line communication signal received at a power line communication input pin (PLCi) 124, the address communication signals received at the data input pins 122 (e.g., Di_0, Di_1, . . . Di_m), and the address communication signals provided by the data output pins 132 (e.g., Out_0, Out_1, . . . Out_m−1) of the driver circuits 120 in a group of driver circuits 120 during the various modes of operation.

During the addressing mode 150 of operation, the power line communication signal received at the power line communication input pin 124 transitions from low to high (i.e., the driver circuits 120 begin to receive a supply voltage) at the beginning of the addressing mode 150. The address communication signals propagate through the data input pins 122 and data output pins 132 of the driver circuits 120 to assign the respective addresses to the driver circuits 120. For instance, the control circuit 110 outputs a logic high signal on the common address communication line Addrn for the group n and the first driver circuit 120 in group n of driver circuits 120 receives the high signal at its data input pin 122 (i.e., Di_0) as an incoming addressing signal. Responsive to detecting the high signal on Di_0, the driver circuit sets its address to an initial address value (e.g., 0000). The first driver circuit 120 stores the address, increments the address value (i.e., increases the address value by one), and provides the incremented address (e.g., 0001) as an outgoing addressing signal via the data output pin 132 (i.e., Out_0) and the serial communication lines 155. The next (successive) driver circuit 120 in group n receives the incremented address (i.e., 0001) at its data input pin 122 (i.e., Di_1) as an incoming addressing signal. The driver circuit 120 similarly stores the address 0001, increments the address, and provides the incremented address (e.g., 0010) as an outgoing addressing signal via the data output pin 132 (i.e., Out_1) and the serial communication line 155 to the next driver circuit 120 in group n. The progression of receiving and storing an address, incrementing the address, and sending the incremented address onto the next driver circuit 120 continues until the addressing mode completes (i.e., all driver circuits 120 in a group of driver circuits 120 have been assigned an address).

In some embodiments, the driver circuit 120 may instead modify the incoming address before storing it. For example, the driver circuit 120 receives an address, increments the address, and stores and outputs the incremented address. In other alternative embodiments, a different arbitrary addressing scheme may be used in which each driver circuit 120 may generate the next address according to some other function that is not necessarily incrementing. For example, the driver circuits 120 may decrement the address, generate random addresses, or apply some other arbitrary function to generate new addresses.

During the configuration mode 160, the power line communication signal received at the power line communication input pin 124 provides various operating parameters (Op Params) as digital data on the power line communication input pin 124.

During the operational mode 170, the power line communication signal provides control data (Con Data) as digital data modulated onto the supply voltage. The Con Data may be updated with each image frame or video frame. The operational mode 170 continues until the power line communication signal transitions from high to low (i.e., the driver circuits 120 no longer receive a supply voltage) at which point the driver circuits 120 turn off.

Figure 2:
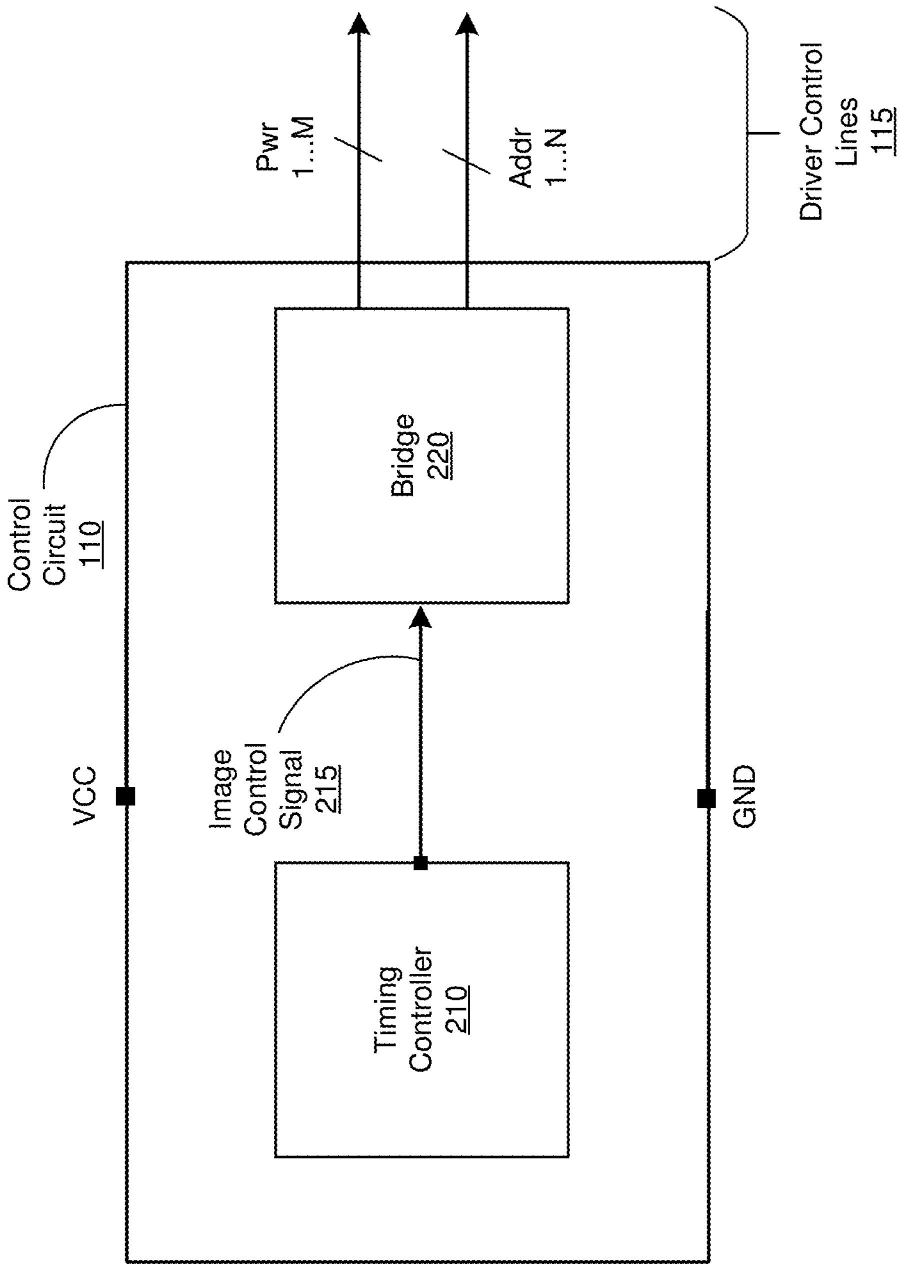
FIG. 2 is an example circuit diagram of a control circuit for a display device, according to one embodiment.

FIG. 2 is an example circuit diagram of a control circuit 110, according to one embodiment. The control circuit 110 generates the address communication signal Addr and the power line communication signal Pwr to control the display device (e.g., the display device 100) and provides the signals via the driver control lines 115 to the driver circuits 120. The control circuit 110 may include a timing controller 210 and a bridge 220. In various embodiments, the control circuit 110 may include additional, fewer, or different components. For example, in some embodiments, the control circuit 110 may be implemented using a field programmable gate array (FPGA) and/or a PHY block. The control circuit 110 is powered by an input voltage (VCC) and is connected to ground (GND). The control circuit 110 may control the display device using either active matrix (AM) or passive matrix (PM) driving methods.

The timing controller 210 generates an image control signal 215 indicating values for driving pixels of the display device 100 and timing for driving the pixels. For example, the timing controller 210 controls timing of image frames or video frames and controls timing of driving each of the LED zones 130 within an image frame or video frame. Furthermore, the timing controller 210 controls the brightness for driving each of the LED zones 130 during a given image frame or video frame. The image control signal 215 is provided by the timing controller 210 to the bridge 220.

The bridge 220 translates the image control signal 215 to the address communication signal Addr and to the driver control signals of the power line communication signal Pwr. For example, the bridge 220 may generate an address communication signal Addr for the first driver circuit 120 in the group of driver circuits 120 during the addressing mode according to the control scheme described above.

Figure 3A:
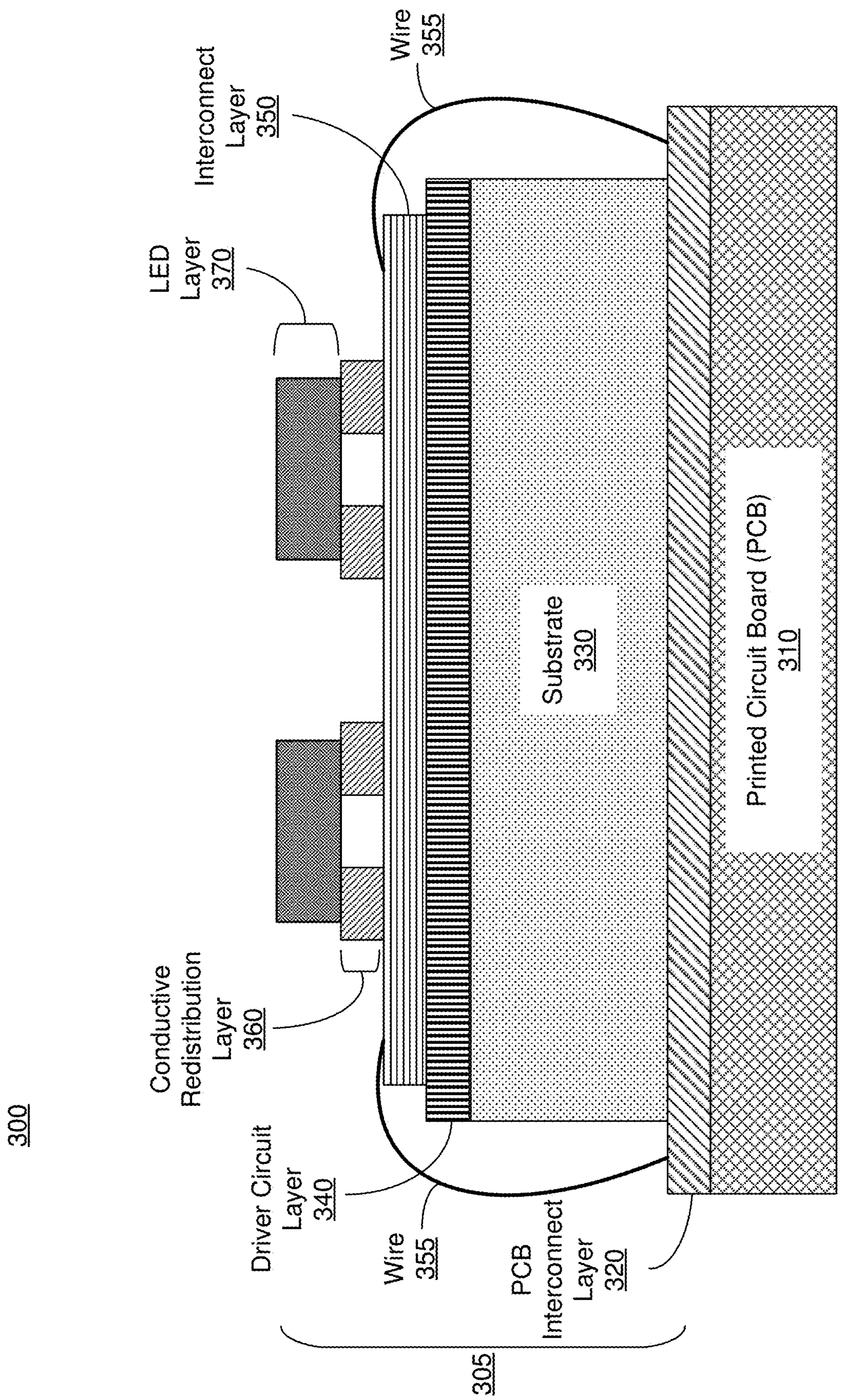
FIG. 3A is a cross sectional view of a first embodiment of an LED and driver circuit that may be utilized in a display device.

FIG. 3A is a cross sectional view of a first embodiment of a display device 300 including an integrated LED and driver circuit 305.

In the example shown in FIG. 3A, the display device 300 includes a printed circuit board (PCB) 310, a PCB interconnect layer 320, and the integrated LED and driver circuit 305 which comprises a substrate 330, a driver circuit layer 340, an interconnect layer 350, a conductive redistribution layer 360, and an LED layer 370. Bonded wires 355 may be included for connections between the PCB interconnect layer 320 and the integrated LED and driver circuit 405. The PCB 310 comprises a support board for mounting the integrated LED and driver circuit 405, the control circuit 110 and various other supporting electronics. The PCB 310 may include internal electrical traces and/or vias that provide electrical connections between the electronics. A PCB interconnect layer 320 may be formed on a surface of the PCB 310. The PCB interconnect layer 320 includes pads for mounting the various electronics and traces for connecting between them.

The integrated LED and driver circuit 305 includes the substrate 330 that is mountable on a surface of the PCB interconnect layer 320. The substrate 330 may be, e.g., a silicon (Si) substrate. In other embodiments, the substrate 330 may include various materials, such as gallium arsenide (GaAs), indium phosphide (InP), gallium nitride (GaN), aluminum nitride (AlN), sapphire, silicon carbide (SiC), or the like.

The driver circuit layer 340 may be fabricated on a surface of the substrate 330 using silicon transistor processes (e.g., BCD processing). The driver circuit layer 340 may include one or more driver circuits 120 (e.g., a single driver circuit 120 or a group of driver circuits 120 arranged in an array). The interconnect layer 350 may be formed on a surface of the driver circuit layer 440. The interconnect layer 350 may include one or more metal or metal alloy materials, such as Al, Ag, Au, Pt, Ti, Cu, or any combination thereof. The interconnect layer 350 may include electrical traces to electrically connect the driver circuits 120 in the driver circuit layer 340 to wire bonds 355, which are in turn connected to the control circuit 110 on the PCB 310. In an embodiment, each wire bond 355 provides an electrical connection. Additionally, the interconnect layer 350 may provide electrical connections for supplying the driver current between the driver circuit layer 440 and the conductive redistribution layer 360.

In an embodiment, the interconnect layer 350 is not necessarily distinct from the driver circuit layer 340 and these layers 340, 350 may be formed in a single process in which the interconnect layer 350 represents a top surface of the driver layer 340.

The conductive redistribution layer 360 may be formed on a surface of the interconnect layer 350. The conductive redistribution layer 460 may include a metallic grid made of a conductive material, such as Cu, Ag, Au, Al, or the like. The LED layer 370 includes LEDs that are on a surface of the conductive redistribution layer 360. The LED layer 370 may include arrays of LEDs arranged into the LED zones 130 as described above. The conductive redistribution layer 360 provides an electrical connection between the LEDs in the LED layer 370 and the one or more driver circuits in the driver circuit layer 440 for supplying the driver current and provides a mechanical connection securing the LEDs over the substrate 330 such that the LED layer 370 and the conductive redistribution layer 360 are vertically stacked over the driver circuit layer 340.

Thus, in the illustrated circuit 305, the one or more driver circuits 120 and the LED zones 130 including the LEDs are integrated in a single package including a substrate 330 with the LEDs in an LED layer 370 stacked over the driver circuits 120 in the driver circuit layer 340. By stacking the LED layer 370 over the driver circuit layer 340 in this manner, the driver circuits 120 can be distributed in the display area 105 of a display device 100.

Figure 3B:
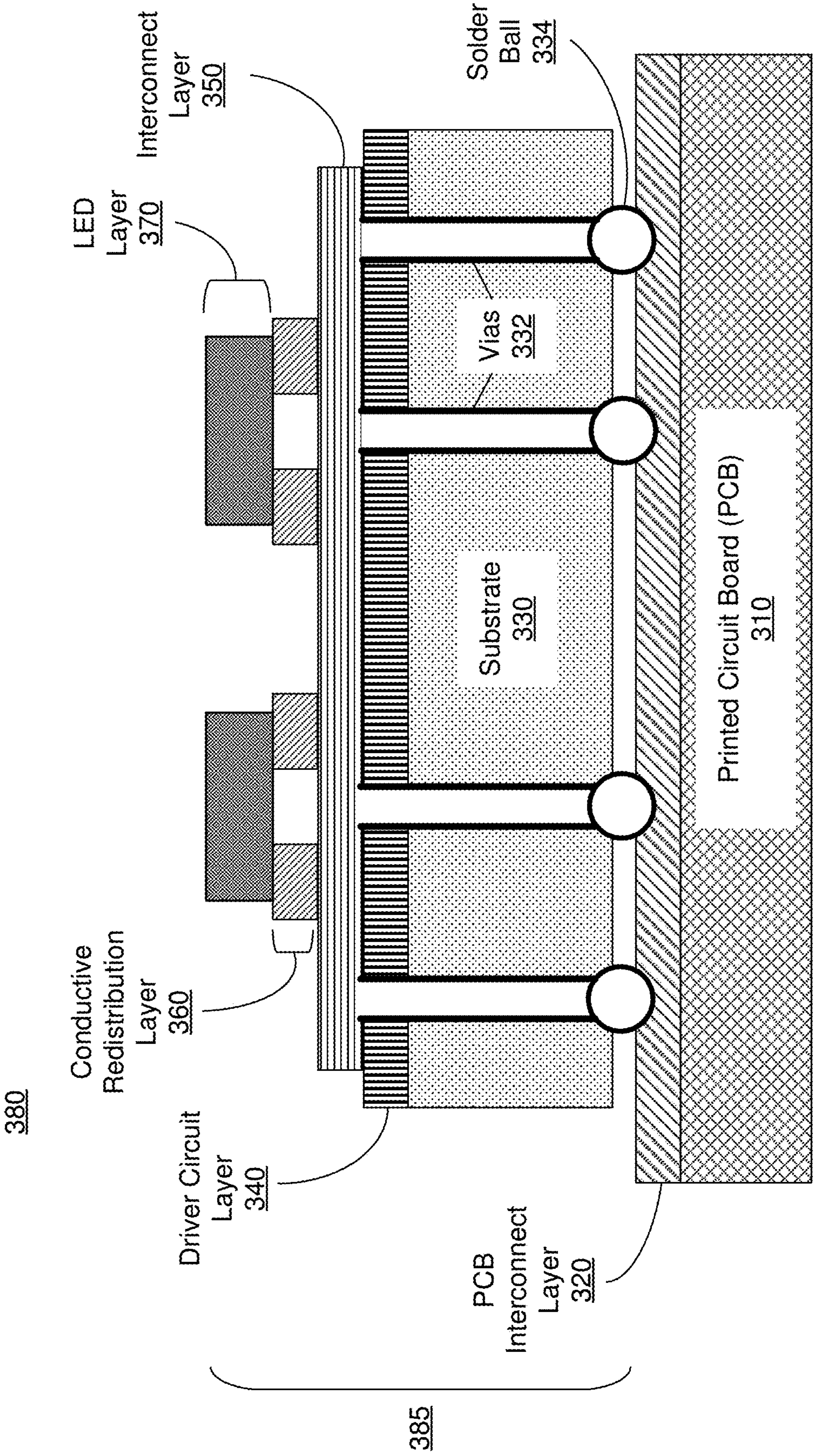
FIG. 3B is a cross sectional view of a second embodiment of an LED and driver circuit that may be utilized in a display device.

FIG. 3B is a cross sectional view of a second embodiment of a display device 380 including an integrated LED and driver circuit 385, according to one embodiment. The device 380 is substantially similar to the device 300 described in FIG. 3A but utilizes vias 332 and corresponding connected solder balls 334 to make electrical connections between the driver circuit layer 340 and the PCB 310 instead of the wires 355. Here, the vias 332 are plated vertical electrical connections that pass completely through the substrate layer 330. In one embodiment, the substrate layer 430 is a Si substrate and the through-chip vias 332 are Through Silicon Vias (TSVs). The through-chip vias 332 are etched into and through the substrate layer 330 during fabrication and may be filled with a metal, such as tungsten (W), copper (C), or other conductive material. The solder balls 334 comprise a conductive material that provide an electrical and mechanical connection to the plating of the vias 332 and electrical traces on the PCB interconnect layer 320. In one embodiment, each via 332 provides an electrical connection for providing signals such as the driver control signal from the control circuit 110 on the PCB 310 to a group of driver circuits 120 on the driver circuit layer 340. The vias 332 may also provide connections for the incoming and outgoing addressing signals, the supply voltage (e.g., VLED) to the LEDs in a LED zone 130 on the LED layer 370, and the path to a circuit ground (GND).

Figure 3C:
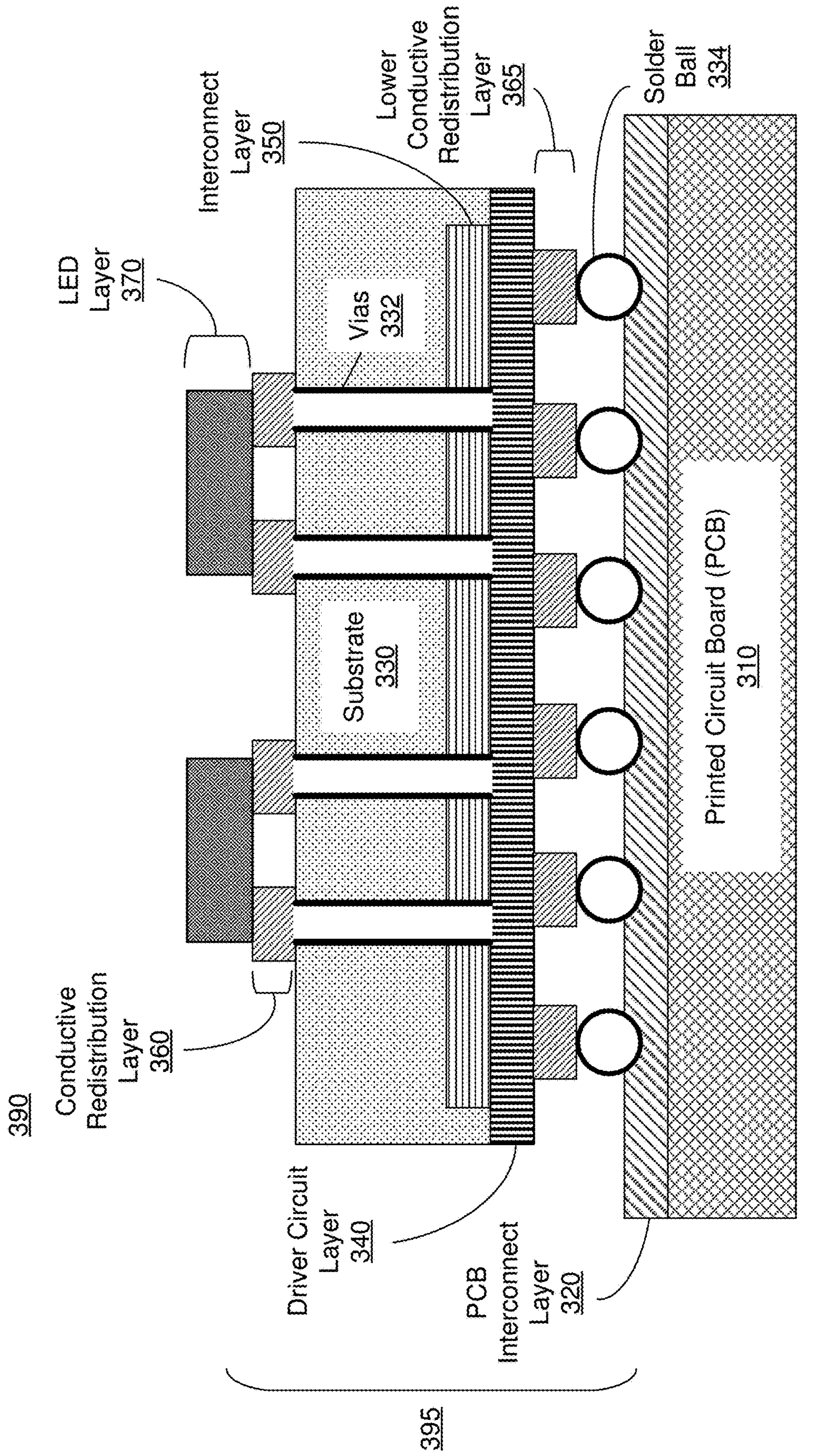
FIG. 3C is a cross sectional view of a third embodiment of an LED and driver circuit that may be utilized in a display device.

FIG. 3C is a cross sectional view of a third embodiment of a display device 390 including an integrated LED and driver circuit 395. The device 390 is substantially similar to the device 380 described in FIG. 3B but includes the driver circuit layer 340 and interconnect layer 350 on the opposite side of the substrate 330 from the conductive redistribution layer 360 and the LED layer 370. In this embodiment, the interconnect layer 350 and the driver circuit layer 340 are electrically connected to the PCB 310 via a lower conductive redistribution layer 365 and solder balls 334. The lower conductive redistribution layer 365 and solder balls 334 provide mechanical and electrical connections (e.g., for the driver control signals) between the driver circuit layer 340 and the PCB interconnect layer 320. The driver circuit layer 340 and interconnect layer 350 are electrically connected to the conductive redistribution layer 360 and the LEDs of the LED layer 370 via one or more plated vias 332 through the substrate 330. The one or more vias 332 seen in FIG. 3C may be utilized to provide the driver currents from the driver circuits in the driver circuit layer 340 to the LEDs in the LED layer 370 and other signals as described above.

In alternative embodiments, the integrated driver and LED circuits 305, 385, 395 may be mounted to a different base such as a glass base instead of the PCB 310.

Figure 4:
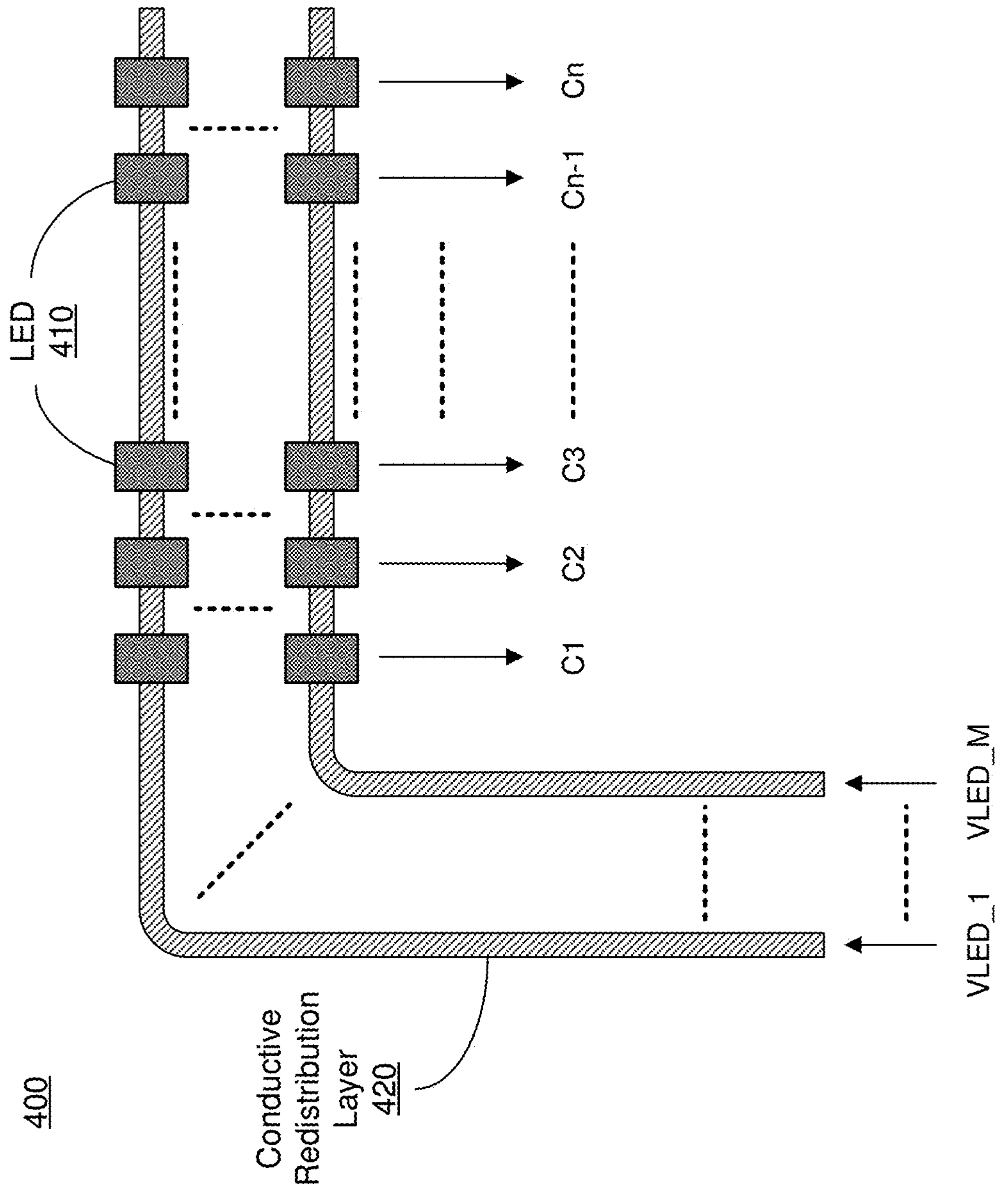
FIG. 4 is a top down view of a display device using an LED and driver circuit, according to one embodiment.

FIG. 4 is a top down view of a display device using an integrated LED and driver circuit 400, according to one embodiment. The circuit 400 can correspond to a top view of any of the integrated LED and driver circuits 305, 385, 395 depicted in FIGS. 3A-3C. A plurality of LEDs 410 is arranged in rows and columns (e.g., C1, C2, C3, . . . Cn−1, Cn) in FIG. 4. For passive matrix architectures, each row of LEDs 410 is connected by a conductive redistribution layer 420 to a demultiplexer which outputs a plurality of VLED signals (i.e., VLED_1 . . . VLED_M). The VLED signals provide power (i.e., a supply voltage) to a corresponding row of LEDs 410 via the conductive redistribution layer 420.

Figure 5:
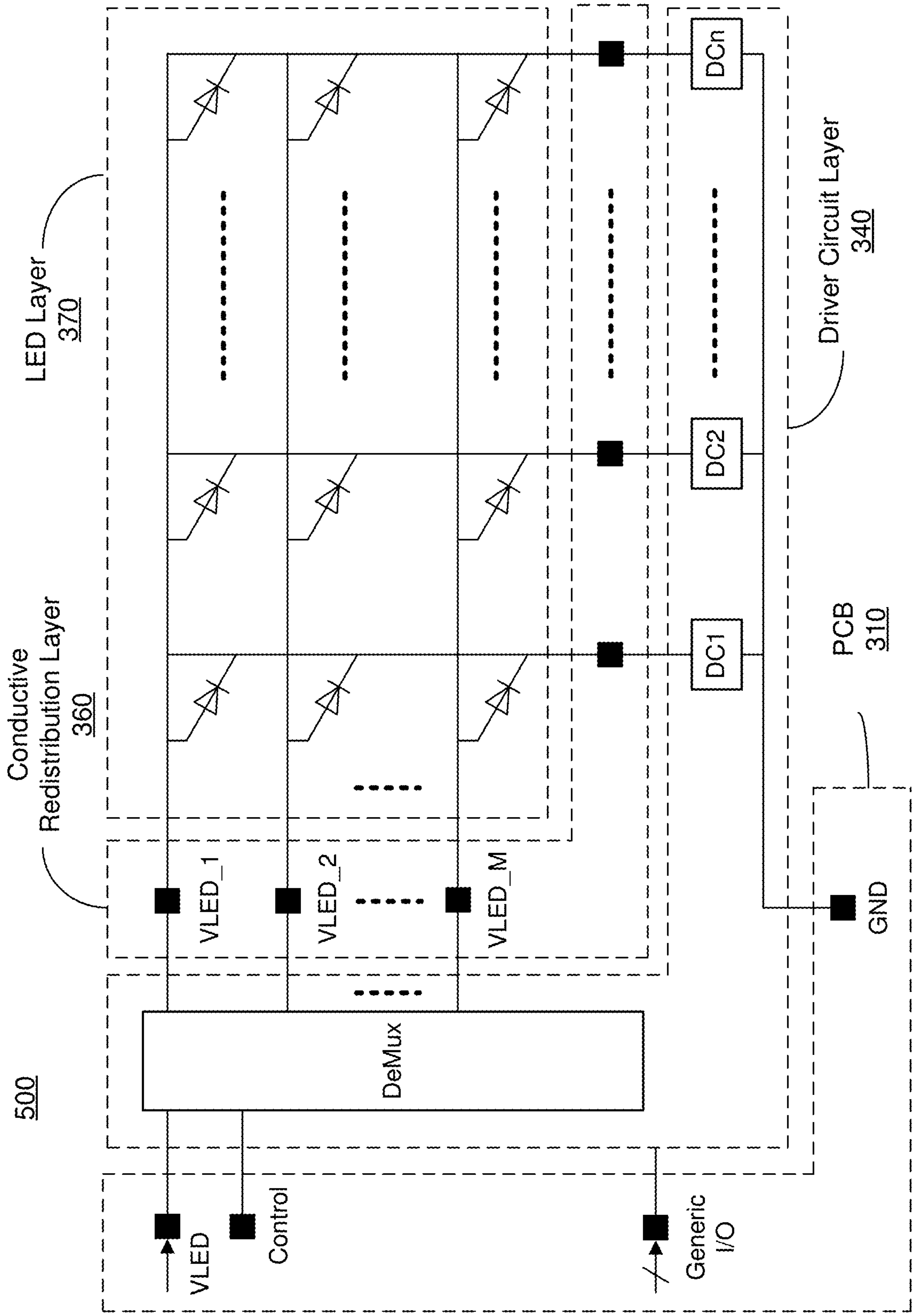
FIG. 5 illustrates a schematic view of several layers of an LED and driver circuit for a display device, according to one embodiment.

FIG. 5 illustrates a schematic view of several layers of a display device 500 with an integrated LED and driver circuit, according to one embodiment. The schematic view includes the PCB 310, the driver circuit layer 340, the conductive redistribution layer 360, and the LED layer 370 as described in FIGS. 3A-3C. The schematic of FIG. 5 shows circuit connections for the circuits 310, 340, 360, and 370 of FIGS. 3A-3C but does not reflect the physical layout. As described above, in the physical layout, the LED layer 370 is positioned on top of (i.e., vertically stacked over) the conductive redistribution layer 360. The conductive redistribution layer 360 is positioned on top of the driver circuit layer 340 and the driver circuit layer 340 is positioned on top of the PCB 310.

The PCB 310 includes a connection to a power source supplying power (e.g., VLED) to the LEDs, a control circuit for generating a control signal, generic I/O connections, and a ground (GND) connection. The driver circuit layer 340 includes a plurality of driver circuits (e.g., DC1, DC2, . . . DCn) and a demultiplexer DeMux. The conductive redistribution layer 360 provides electrical connections between the driver circuits and the demultiplexer DeMux in the driver circuit layer 340 to the plurality of LEDs in the LED layer 370. The LED layer 370 includes a plurality of LEDs arranged in rows and columns. In this example implementation, each column of LEDs is electrically connected via the conductive redistribution layer 360 to one driver circuit in the driver circuit layer 340. The electrical connection established between each driver circuit and its respective column of LEDs controls the supply of driver current from the driver circuit to the column. In this embodiment, each diode shown in the LED layer corresponds to an LED zone. Each row of LEDs is electrically connected via the conductive redistribution layer 360 to one output (e.g., VLED_1, VLED_2, . . . VLED_M) of the demultiplexer DeMux in the driver circuit layer 340. The demultiplexer DeMux in the driver circuit layer 340 is connected to a power supply (VLED) and a control signal from the PCB 310. The control signal instructs the demultiplexer DeMux which row or rows of LEDs are to be enabled and supplied with power using the VLED lines. Thus, a particular LED in the LED layer 370 is activated when power (VLED) is supplied on its associated row and the driver current is supplied to its associated column.

Redundant Schemes

Figure 6A:
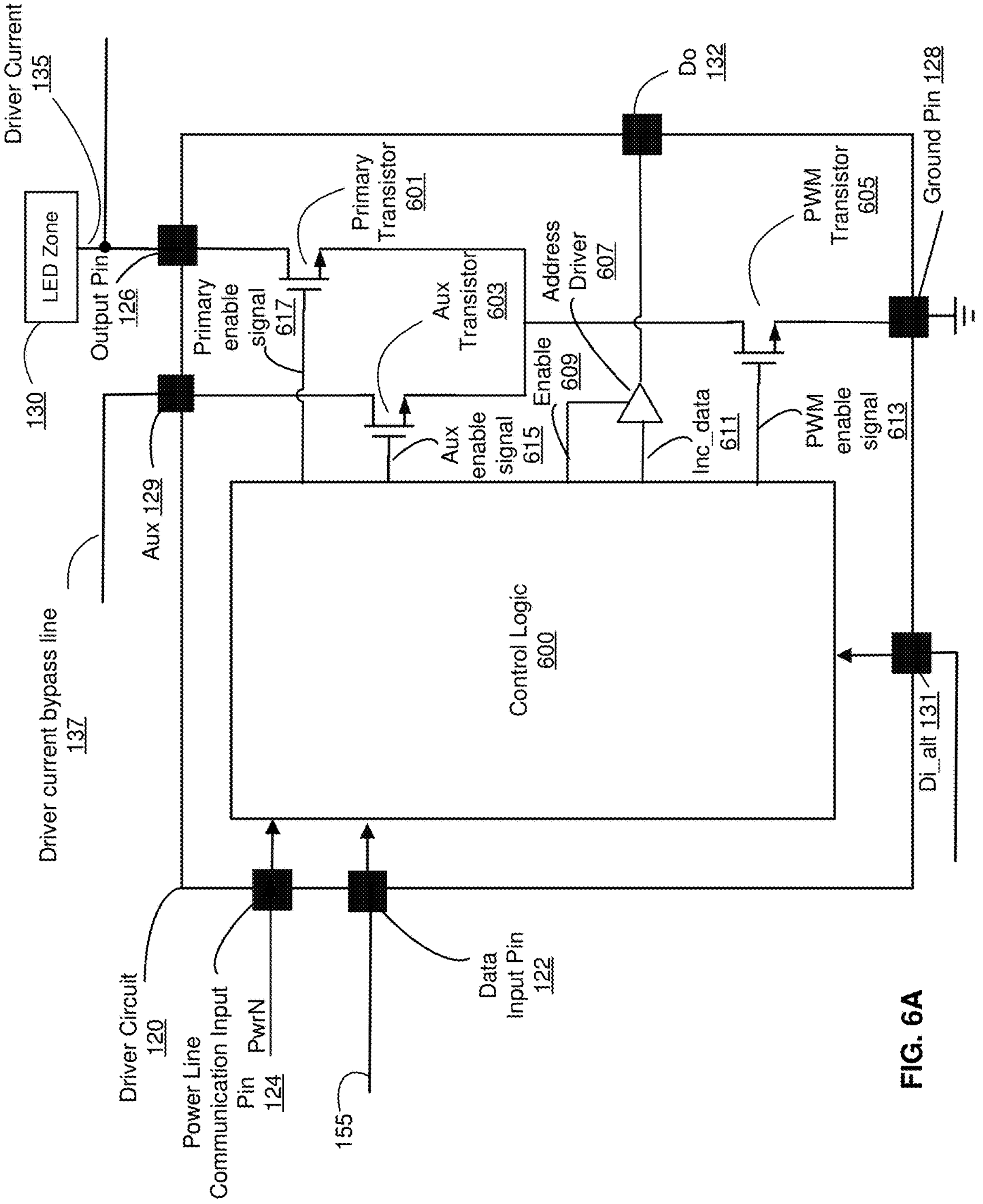
FIG. 6A is an example circuit diagram of a driver circuit for a display device, according to one embodiment.

FIG. 6A is an example circuit diagram of the driver circuit 120, according to one embodiment. The driver circuit 120 may include a control logic 600, a primary transistor 601, an auxiliary transistor 603, a pulse width modulation (PWM) transistor 605, an address driver 607, as well as a set of pins including the power line communication input pin 124, the data input pin 122, the alternate data input pin 131, the auxiliary pin 129, the output pin 126, the data output pin 132, and the ground pin 128. In various embodiments, the driver circuit 120 may include additional, fewer, or different components.

In one embodiment, each driver circuit 120 may be either "non-operational" if it is broken due to a fault condition in the driver circuit 120 or may be "operational" if the driver circuit 120 lacks any fault conditions. An operational driver circuit 120 may be configured to operate in either a "normal mode" (e.g., a first mode) or a "fault mode" (e.g., a second mode). The "normal mode" of a driver circuit 120 is activated when all of the prior driver circuits 120 in the group are operational (e.g., lack a fault condition). In contrast, the "fault mode" of the driver circuit 120 is activated when any prior driver circuits 120 of a given driver circuit is non-operational due to a fault condition. If a given driver circuit 120 is non-operational, all downstream driver circuits 120 in the group are configured in the fault mode. Here, the "prior" driver circuits 120 of a given driver circuit 120 include the subset driver circuits 120 that are coupled in the chain between the given driver circuit 120 and the control circuit 110.

As shown in FIG. 6A, inputs of the control logic 600 are connected to the power line communication input pin 124, the data input pin 122, and the alternate data input pin 131. Based on the inputs to the control logic 600, the control logic 600 performs various functionality such as addressing and LED driving as will be described in further detail below.

In one embodiment, the primary transistor 601 is configured to connect the driver circuit 120 to the LED zone 130 when the prior driver circuit 120 coupled to the auxiliary pin 129 is in the normal mode, and to disconnect the driver circuit 120 from the driver circuit's corresponding LED zone 130 when the prior driver circuit coupled to the auxiliary pin 129 is in the fault mode or is non-operational. As shown in FIG. 6A, the drain electrode of the primary transistor 601 is connected to the output pin 126, a gate electrode of the primary transistor 601 is connected to an output of the control logic 600, and a source electrode of the primary transistor 601 is connected to a source electrode of the auxiliary transistor 603 and a drain electrode of the PWM transistor 605.

In one embodiment, the auxiliary transistor 603 is configured to connect the driver circuit 120 to the LED zone 130 of the driver circuit's prior neighbor via the driver current bypass line 137 responsive to the neighbor being non-operational or in the fault mode, and to disconnect the driver circuit 120 from the driver current bypass line 137 responsive to the neighbor being in the normal mode. As shown in FIG. 6A, The drain electrode of the auxiliary transistor 603 is connected to the auxiliary pin 129, a gate electrode of the auxiliary transistor 603 is connected to an output of the control logic 600, and a source electrode of the auxiliary transistor 603 is connected to the source electrode of the primary transistor 601 and the drain electrode of the PWM transistor 605.

In one embodiment, the PWM transistor 605 is configured by the control circuit 600 to control the magnitude of the driver current 135. As shown in FIG. 6A, the drain electrode of the PWM transistor 605 is connected to the source electrodes of the auxiliary transistor 603 and the primary transistor 601, a gate electrode of the PWM transistor 605 is connected to an output of the control logic 600, and a source electrode of the PWM transistor 605 is connected to the ground pin 128.

In one embodiment, the address driver 607 is configured to output address signals to the next driver circuit 120 via the data output pin 132. An input of the address driver 607 is connected to an output of the control logic 600 and an output of the address driver 607 is connected to the data output pin 132. Functionality of the control logic 600, the primary transistor 601, the auxiliary transistor 603, the pulse width modulation (PWM) transistor 605, and the address driver 607 are further described below.

The control logic 600 receives the power line communication signal (PwrN) at the power line communication input pin 124. As mentioned above, the power line communication signal includes a direct voltage component and a modulated component. In one embodiment, the direct current voltage component of the power line communication signal is used to power the driver circuit 120. The direct current voltage may be 1.8 volts for example. In contrast, the modulated component of the power line communication signal is digital data that represents a driver control signal.

During the addressing mode, the control logic 600 may receive an incoming addressing signal via at least one of the data input pin 122 or the alternate data input pin 131. Whether the incoming addressing signal is received at both the data input pin 122 and the alternate data input pin 131 or at the alternate data input pin 131 but not the data input pin 122 is dependent on whether the prior driver circuit 120 coupled to the Di pin 122 of the given driver circuit 120 is operational or non-operational.

If the addressing signal is received at the data input pin 122 and the alternate data input pin 131 of a given driver circuit 120, the prior driver circuit 120 is operational as the prior driver circuit 120 outputted the addressing signal via its output data pin 132. As a result of the prior driver circuit being operational, the given driver circuit is placed in the normal mode. However, if the addressing signal is received by the given driver circuit 120 at its alternate data input pin 131, but not the data input pin 122, the prior driver circuit is determined to be non-operational. As a result of the prior driving circuit being non-operational, all remaining downstream driver circuits 120 in the group are placed in the fault mode.

Dependent on whether a driver circuit 120 is non-operational or operational and the mode of operation if the driver circuit 120 is operational (e.g., normal mode or the fault mode), the control logic 600 may output an enable signal 609, an incremented data signal Inc_data 611, a PWM enable signal 613, an Aux enable signal 615, and/or a primary enable signal 617. During the addressing mode, the control logic 600 activates the enable signal 609 to enable the address driver 607. The control logic 600 receives an incoming address signal via at least one of the data input pin 122 or the alternate data input pin 131 depending on whether the prior driver circuit is operational or non-operational, stores the address, and provides the incremented data signal Inc_data 611 representing an outgoing address to the address driver 607. The address driver 607 buffers the incremented data signal Inc_data 611 to the data output pin 132 when the enable signal 609 is activated during the addressing mode.

The control logic 600 may control the PWM transistor 605 during the addressing mode to effectively block the current path from the LED zone 130. That is, the control logic 600 may keep the PWM transistor 605 in a disabled state by applying the PWM enable signal 613 at a level that turns off the PWM transistor 605.

During the operational mode and configuration modes, the control logic 600 deactivates the enable signal 609 and the output of the address driver 607 is tri-stated to effectively decouple it from the output pin 126. Furthermore, during the operational mode, the control logic 600 outputs the primary enable signal 617 to control timing of an on-state and off-state of the primary transistor 601, outputs the auxiliary enable signal 615 to control timing of an on-state and off-state of the auxiliary transistor 603, and outputs the PWM enable signal 613 to control timing of an on-state and off-state of the PWM transistor 605.

During the operational mode, the control logic 600 outputs the PWM enable signal 613 that controls the timing of an on-state and off-state of the PWM transistor 605 according to a selected duty cycle. During the on-state of the PWM transistor 605, a current path is established from the output pin 126 (coupled to the LED zones 130) to the ground pin 128 through the PWM transistor 605 and one of the auxiliary transistor 603 or the primary transistor 601 to sink the driver current 135 through the LEDs of the LEDs zones 130. During an off-state of the PWM transistor 605, the current path is interrupted to block current from flowing through the LED zones 130.

As mentioned above, each LED zone 130 has the option of being driven by its neighbor coupled to the driver current bypass line 137 depending on whether the LED zone's corresponding driver circuit 120 (coupled via the output pin 126) is non-operational or is operational, but in the fault mode. If the driver circuit 120's neighboring driver circuit (coupled to its aux pin 129) is in the normal mode, the control logic 600 activates the normal mode of the driver circuit 120. The normal mode is activated by disabling the auxiliary transistor 603 using the aux enable signal 615 at a level that turns off the auxiliary transistor 603 and enabling the primary transistor 601 using the primary enable signal 617 at a level that turns on the primary transistor 601. Since the driver circuit 120's neighboring driver circuit is in the normal mode, the driver circuit 120 does not need to drive the LED zone 130 coupled to the previous neighboring driver circuit and instead drives its corresponding LED zone 130.

However, if the driver circuit 120's neighboring driver circuit coupled to its aux pin 129 is non-operational or is operational but in the fault mode, the control logic 600 activates the fault mode of the driver circuit 120. The fault mode is activated by enabling the auxiliary transistor 603 using the aux enable signal 615 at level that turns on the auxiliary transistor 603 and disabling the primary transistor 601 using the primary enable signal 617 at a level that turns off the primary transistor 601. Since the driver circuit 120's neighboring driver circuit is non-operational or in the fault mode, the driver circuit 120 will drive the LED zone 130 of the neighbor that is non-operational or is in the fault mode.

Figure 6B:
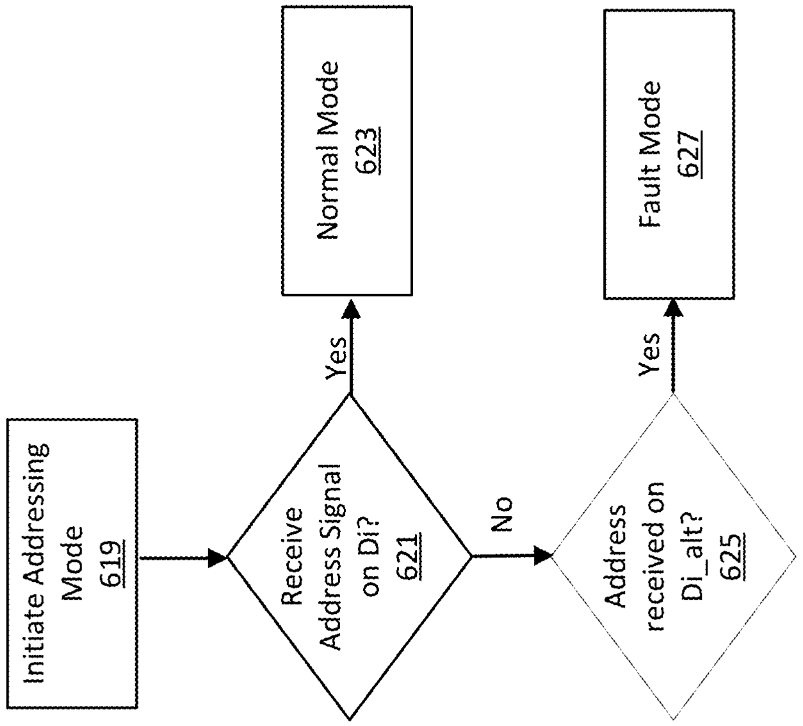
FIG. 6B is a method flow diagram of an addressing scheme of the driver circuit according to one embodiment.

FIG. 6B illustrates a method flow diagram of a process implemented by the control logic 600 of each driver circuit 10 to determine whether to operate in the normal mode or fault mode according to one embodiment. The method shown in FIG. 6B bypasses any non-operational driver circuit in the daisy chain of driver circuits 120 included in a group of driver circuits.

In one embodiment, the control logic 600 initiates 619 the addressing mode 619 of the driver circuit 120. The control logic 600 determines 621 whether address signal is received via the data input pin 122 and the alternate data input pin 131. Receiving the address signal at the data input pin 122 signifies that the prior driving circuit coupled to the Di pin 122 of the driver circuit 120 is operational. The address signal received at the alternate data input pin 131 is ignored in one embodiment. Accordingly, the control logic 600 activates 623 the normal mode of the driver circuit 120 since the neighboring driver circuit coupled to the Di pin 122 is operational. As mentioned above, during normal mode the address driver 607 outputs the incremented data signal Inc_data 611 to the data output pin 132 of the driver circuit 120. Furthermore, during normal mode the control logic 600 disables the auxiliary transistor 603 and enables the primary transistor 601 to drive the LED zone 130 connected to the driver circuit 120. If the address signal is received at the alternate data input pin 131, but not at the data input pin 122, the control logic 600 determines 625 that the prior driver circuit coupled to the Di pin 122 is non-operational and activates 627 the fault mode of the driver circuit 120. During the fault mode, the driver circuit 120 obtains the address signal from the alternate data pin 131. During the fault mode, the next address is sent to the subsequent driver circuit via the data output pin 132 and the control logic 600 sets an internal auxiliary flag.

Responsive to the auxiliary flag, the control logic 600 disables the primary transistor 601 to disconnect the LED zone 130 from the driver circuit 130 and connects the driver circuit 120 to the LED zone of the prior driver circuit via the auxiliary pin 120 by enabling the auxiliary transistor 603. By being connected to the LED zone of the prior driver circuit through the auxiliary transistor 603, the driver circuit 120 can now drive the LED zone 130 of the prior driver circuit through the driver circuit 120's auxiliary pin 120 via the driver current bypass line 137. Disabling the primary transistor 601 prevents the driver circuit 120 from driving the LED zone 130 connected to the output pin 126 of the driver circuit 120.

Figure 7A:
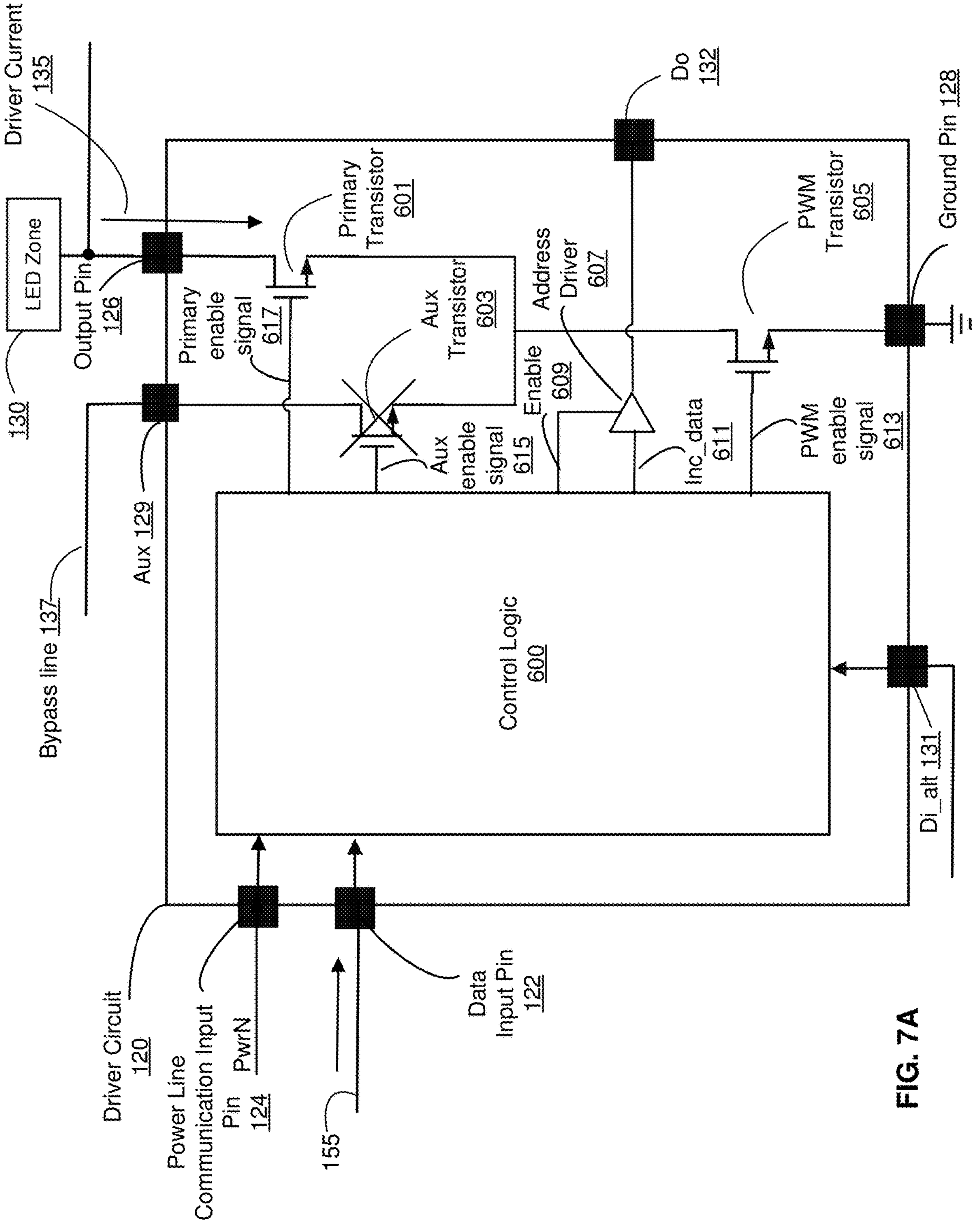
FIGS. 7A to 7C illustrate different operational states of the driver circuit according to one embodiment.

In one embodiment, the address output to the next driver circuit via the data output pin 132 of the driver circuit 120 that is in the fault mode includes a fault flag. The fault flag is propagated to the remaining driver circuits 120 in the group responsive to the driver circuit 120 being in the fault mode. The fault flag causes the remaining driver circuits 120 in the group to activate the fault mode even though the remaining driver circuits 120 are operational. FIG. 7A illustrates an example of the driver circuit 120 that is operational and in the normal mode according to one embodiment. In FIG. 7A, the address signal is received at the data input pin 122 of driver circuit 120 and the alternate data input pin 131 signifying that the prior driver circuit 120 connected to the data input pin 122 via the communication line 155 is operational and in the normal mode. Accordingly, the address signal is outputted to the next driver circuit 120 via the data output pin 132 and the control logic 600 disables the auxiliary transistor 603 thereby disconnecting the driver circuit 120 from the neighbor's LED zone 130 and enables the primary transistor 601 to connect the driver circuit 120 to its LED zone 13 via output pin 126. As shown in FIG. 7A, during normal mode the driver current 135 flows through the primary transistor 601 to ground.

Figure 7B:
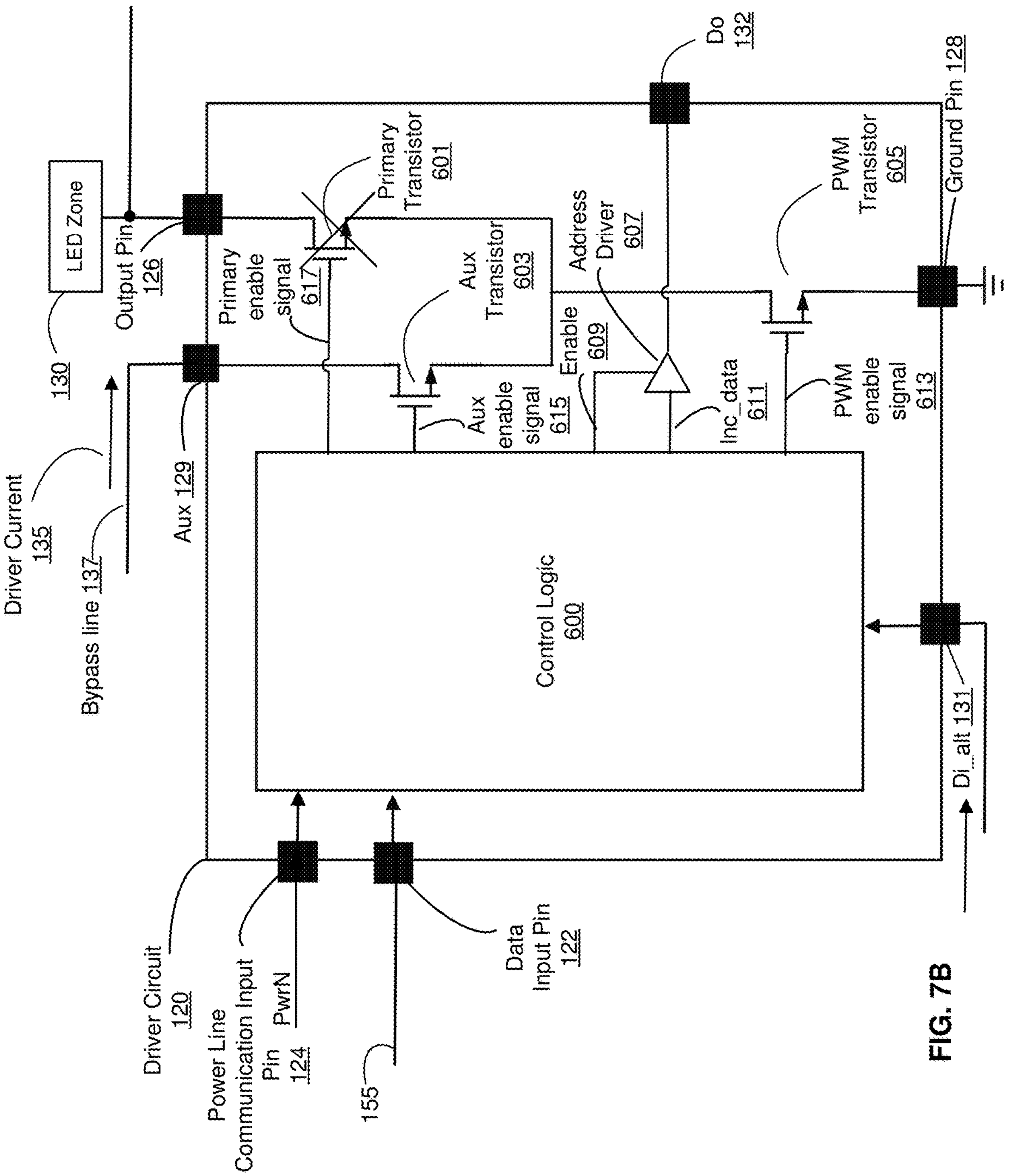

FIG. 7B illustrates an example of the driver circuit 120 that is operational, but in the fault mode according to one embodiment. In FIG. 7B, the address signal is still received at the alternate data input pin 131 of the driver circuit 120 rather than the data input pin 122. By receiving the address signal at the alternate data input pin 131 rather than the data input pin 122, the control logic 600 determines that its prior driver circuit 120 is non-operational due to a fault condition and the driver circuit 120 must activate the fault mode. Alternatively, the address signal is received at both the data input pin 122 and the alternate data input pin 131 along with the fault flag from the prior driver circuit that causes the driver circuit 120 to activate the fault mode.

During the fault mode, the driver circuit 120 is responsible for driving the LED zone 130 connected to the bypass line 127 via the auxiliary pin 120 of the prior driver circuit 120 that is non-operational or is in the fault mode. Accordingly, the address signal is outputted to the next driver circuit 120 via the data output pin 132 along with the fault flag and the control logic 600 disables the primary transistor 601 thereby disconnecting the driver circuit 120 from its LED zone 130 and enables the auxiliary transistor 603 thereby connecting the driver circuit 120 to the neighboring LED zone 130 via the auxiliary pin 129 and the driver current bypass line 137. A shown in FIG. 7B, during fault mode the driver current 135 flows through the auxiliary transistor 603 transistor 601 to ground.

Figure 7C:
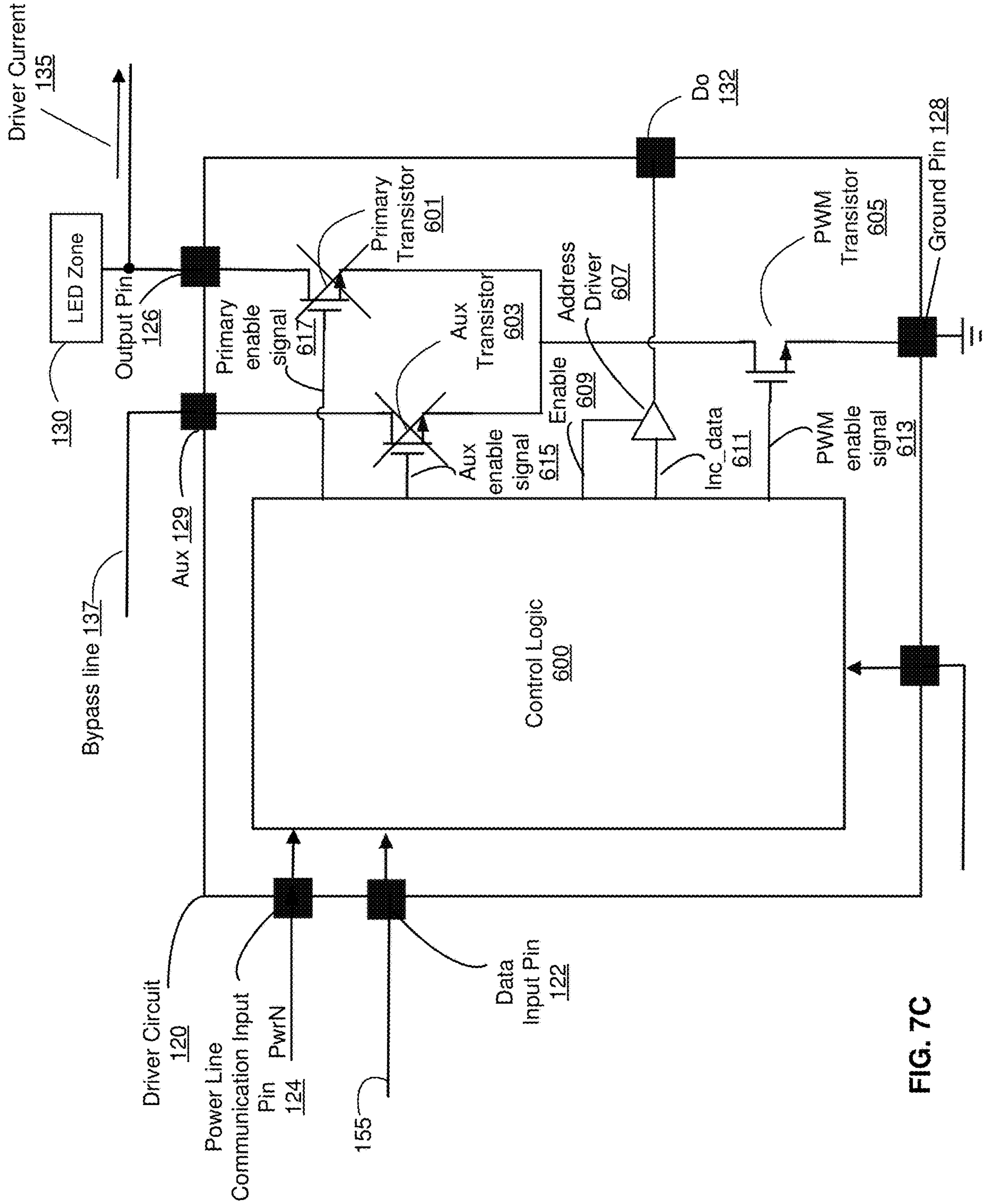

FIG. 7C illustrates an example of a non-operational driver circuit due to a fault condition in the driver circuit according to one embodiment. In one embodiment, if a driver circuit 120 is non-operational due to a fault, the non-operational driver circuit 120 is configured in an "open" condition. In the open condition, some or all pins on the non-operational driver circuit 120 are disconnected from the outside system, or put into a hi-Z (high-impedance) state. For example, the control logic 600 may disable the data input pin 122 and the data output pin 132. The control logic 600 may alternatively or in addition to disabling the data input pin 122 and the data output pin 132, disable both the auxiliary transistor 603 and the primary transistor 601 thereby disabling the auxiliary pin 129 and the output pin 126 if the control logic 600 determines that the driver circuit 120 is non-operational to prevent the non-operational driver circuit 120 from driving its LED zone 130 or its neighbor's LED zone 130 via its bypass line 137. Thus, the non-operational driver circuit 120 is disconnected from its LED zone connected via the output pin 126 as well as its neighbor's LED zone that is connected via the auxiliary pin 129. By being configured in the "open" condition (e.g., a high-impedance state), the non-operational driver circuit 120 is less likely to adversely affect other parts of the display device 100. For example, a non-operational driver circuit 120 may short an external signaling node to a fixed voltage so that the signaling node (either analog of digital) is unable to change voltage.

The control logic 600 may determine that the driver circuit 120 is non-operational by executing a self-test to determine a fault. Based on the results of the self-test, the control logic 600 may disable (e.g., turn off) some or all of the driver's internal circuits such as at least the auxiliary transistor 603 and the primary transistor 601. In addition, the control logic 600 may disable at least one of the PWM transistor 605 and the address driver 607. By disabling the address driver 607, the driver circuit 120 effectively modifies the behavior of the data output pin 132 such that it does not pass an address signal to its neighboring driver circuit 120. In this way, the addressing scheme ensures registration of the driver circuit as non-operational.

In one embodiment, the control logic 600 receives the incoming address signal and the power communication signal and executes the self-test based on the received signals. The control logic 600 may analyze the address signal and the power communication signal for particular criteria that indicates that the driver circuit 120 is non-operational due to a fault. For example, the control logic 600 may determine that the address signal itself is invalid and thereby place pins of the driver circuit 120 in the open state. In another example, the control logic 600 may analyze the magnitude of a supply voltage generated by a power supply internal to the driver circuit 120 (not shown) to determine that a magnitude of the supply voltage is below a minimum voltage or is above a maximum voltage required to supply internal power to the components of the driver circuit 120. As a result, the control logic may place pins of the driver circuit 120 in the open state. The control logic 600 may place the driver circuit 100 in the open state for various other criteria such as an indication that a clock signal generated by an oscillator of the driver circuit 120 (not shown) is invalid for example.

Figure 8A:
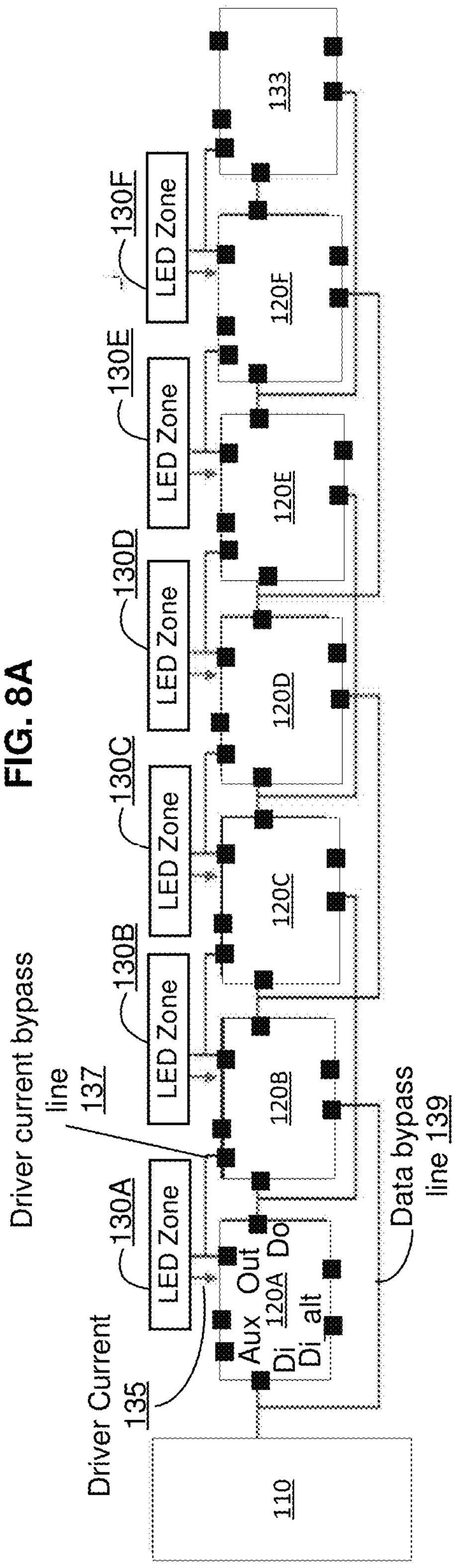
FIGS. 8A and 8B illustrate a row based redundancy scheme of the display device according to one embodiment.

FIG. 8A illustrates an example architecture for a group of driver circuits that includes driver circuits 120A to 120F and redundant driver circuit 133 where none of the driver circuits 120A to 120F are non-operational in accordance with one embodiment. The group of driver circuits uses serial addressing as discussed above. The redundant driver circuit 133 is used only in the event of a fault of at least one of the driver circuits 120A to 120F causing one of the driver circuits to be non-operational. Although only a single redundant driver circuit 133 is shown, the group of driver circuits can have any number of redundant driver circuits 133.

In the example shown in FIG. 8A, all of the driver circuits 120A to 120F are operational and in the normal mode (e.g., the driver circuits are operational) and thus the redundant driver circuit 133 is not used. All of the driver circuits 120A to 120F are operational and in the normal mode as indicated by the LED zone 130 of each driver circuit 120 being driven using driver current 135 via its output pin (Out) 126 and none of the driver currents 135 being driven by the auxiliary pin 129 of its subsequent neighbor.

Figure 8B:
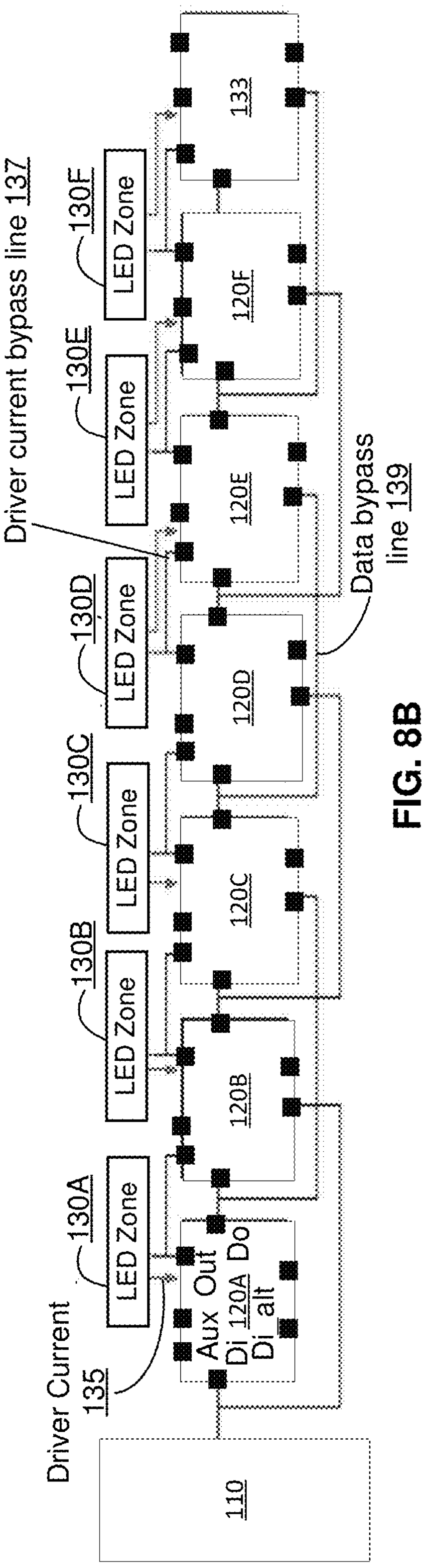

FIG. 8B illustrates an example architecture for a group of driver circuits that includes driver circuits 120A to 120F and redundant driver circuit 133 where one of the driver circuits is non-operational due to a fault condition in accordance with one embodiment. In the example shown in FIG. 7B, driver circuit 120D is non-operational.

As a result of driver circuit 120D being non-operational, all downstream driver circuits that are subsequent to the non-operational driver circuit 120 are switched to the fault mode. Thus, all of the downstream driver circuits are still operational, but the fault mode of the downstream driver circuits are activated. For example, driver circuit 120's next neighboring driver circuit 120E is assigned the address originally intended for the non-operational driver circuit 120D via the data bypass line 139 connected to the alternate data input pin 131 (D_alt) of the driver circuit 120E and the neighboring driver circuit 120E is placed in the fault mode. For example, driver circuit 120E is addressed as the "$4^{th}$" driver circuit in the group although it is physically the $5^{th}$ driver circuit in the group and is placed in the fault mode. In one embodiment, each address is associated with a corresponding LED zone 130 that is driven by the driver circuit 120 that is assigned the address. Thus, a driver circuit 120 assigned a particular address always drives the same LED zone 130 regardless of which driver circuit 120 in the group is assigned the address. Therefore, the control circuit 110 does not need to know which driver circuit 120 is non-operational and can transmit driver control signals to the same address for particular LED zone 130 regardless of which driver circuit 120 is assigned the address. However, note that the control circuit 110 may use readback data as described above to determine the location of a non-operational driver circuit 120 and take further action in some embodiments. However, it is not necessary for the control circuit 110 to know the location of the non-operational driver circuit in order to proceed with normal operation.

The remaining driver circuit 120F and the redundant driver circuit 133 are subsequently addressed with driver circuit 120F being addressed as the "$5^{th}$" driver circuit in the group although it is physically the $6^{th}$ driver circuit in the group and the redundant driver circuit 133 being addressed as the "$6^{th}$" driver circuit in the group although it is physically the $7^{th}$ driver circuit in the group. Driver circuit 120F and the redundant driver circuit 133 are addressed using their respective data input pins 122 since their respective previous neighboring driver circuit is operational. Additionally, the remaining driver circuit 120F and the redundant driver circuit 133 are placed in the fault mode. Note that in one embodiment the redundant driver circuit 133 only operates in the fault mode because if there is no fault the services of the redundant driver 133 are not required.)

Furthermore, as a result of driver circuit 120D being non-operational, driver circuit 120D's LED zone 130D is driven by its next neighboring driver circuit 120E. As shown in FIG. 8B, driver circuit 120E drives the LED zone 130D via the driver current bypass line 137 connected to the auxiliary pin 129 of driver circuit 120E. The output pin (Out) 126 of driver circuit 120E is disabled to prevent the driver circuit 120E from driving its corresponding LED zone 130D.

Since driver circuit 120E cannot drive its LED zone 130E as it is now responsible for driving the LED zone 130D of its prior neighbor (driver circuit 120D), the LED zone 130E is now driven by driver circuit 120E's next neighbor 120F. As shown in FIG. 8B, driver circuit 120F drives the LED zone 130E via its driver current bypass line 137 connected to the auxiliary pin 129 of driver circuit 120F. The output pin (Out) 126 of driver circuit 120F is disabled to prevent the driver circuit 120F from driving its corresponding LED zone 130F.

Since driver circuit 120F cannot drive its LED zone 130F as it is now responsible for driving the LED zone 130E of its previous neighbor (driver circuit 120E), LED zone 130F is now driven by driver circuit 120F's next neighbor which is the redundant driver circuit 133. As shown in FIG. 8B, redundant driver circuit 133 drives the LED zone 130F via its driver current bypass line 137 connected to the auxiliary pin 129 of redundant driver circuit 133.

Figure 9:
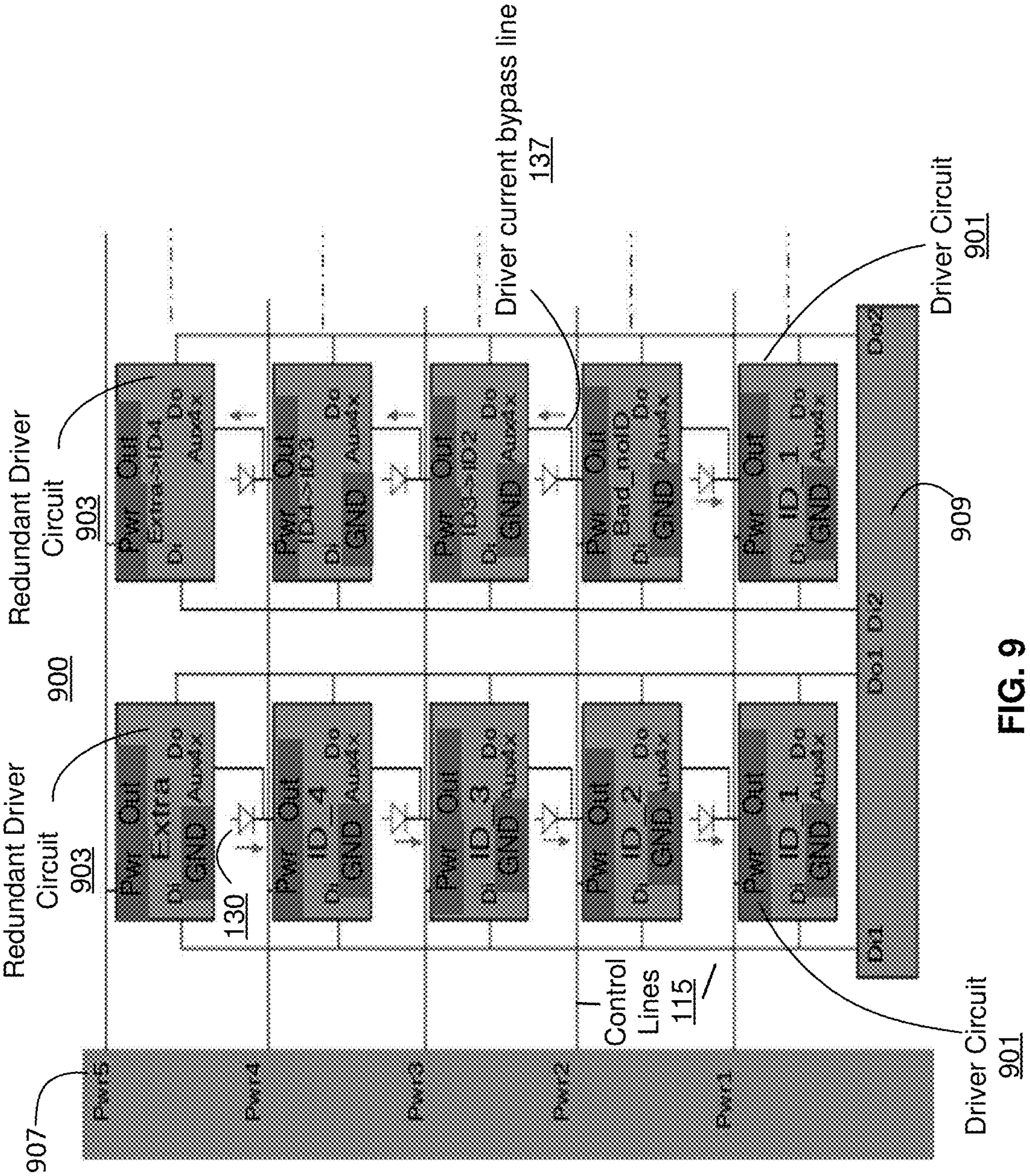
FIG. 9 illustrate a column based redundancy scheme of the display device according to one embodiment.

FIG. 9 illustrates a circuit diagram of a display device 900 for displaying images or video, according to one embodiment. The display device 900 includes similar components as the display device 100 shown in FIG. 1A such as driver circuits 901, redundant driver circuits 903, and LED zones 130 as described above. However, groups of driver circuits and LED zones 130 are arranged in columns rather than rows in display device 900. As shown in FIG. 9, the driver circuits 901 and the redundant driver circuits 903 are connected in parallel and are a six-pin configuration rather than the seven-pin configuration. In one embodiment, the top row of each group includes the redundant driver circuit 903.

Each of the driver circuits 901 and the redundant driver circuits 903 include the output pin (out), a ground pin (Gnd), auxiliary pin (Aux), a data input pin (Di), and a data output pin (Do). The driver circuits 901 also include a power pin (Pwr). Each power pin (Pwr) is a pin dedicated for supplying power to its corresponding driver circuit 901. As shown in FIG. 9, the data input pins (Di) of all the driver circuits 901 and redundant driver circuits 903 in a group are connected in parallel and the data output pins (Do) of all the driver circuits 901 and redundant driver circuits 903 in the group are connected in parallel. The output pin (Out) of each driver circuit 901 is connected to the auxiliary pin (Aux) of the previous neighboring driver circuit as shown in FIG. 9.

Furthermore, power pins (Pwr) of horizontally adjacent driver circuits 901 and redundant driver circuits 903 belonging to different groups are connected to a common power line. For example, the power pins (Pwr) of driver circuits ID__1 in the left and right groups are commonly connected to power supply line Pwr_1, the power pins (Pwr) of driver circuits ID__2 in the left and right groups are commonly connected to power supply line Pwr2, and so on.

The display device 900 also includes a power supply circuit 907 and an addressing circuit 909. The power supply circuit 907 supplies power to the driver circuits 901 and redundant driver circuits 603 via the power lines Pwr. Thus, the power supply circuit 901 can turn on a single row of driver circuits 120 at a time for addressing without requiring serial communication. In one embodiment, the addressing circuit 909 generates addressing signals output to the left column of driver circuits 901 and redundant driver circuit 903 via data input line Di1 and addressing signals output to the right column of driver circuits 120 and redundant driver circuit 903 via data input line Di2. Once the addressing circuit 909 has addressed all of the driver circuits 120 and redundant driver circuits 903, the addressing circuit 909 can send commands to the data input pins Di of the driver circuits 120 and redundant driver circuits 903 or request readback data received via the data output pins Do.

In the example shown in FIG. 9, the left group of driver circuits are all operational and in the normal mode. Thus, each driver circuit 901 is responsible for driving its own LED zone 130 via the output pin (Out) of the driver circuit 901. In contrast, the right group of driver circuits includes a non-operational driver circuit. In the right group of driver circuits, driver circuit "Bad_noID" is non-operational. As a result, the non-operational driver circuit is bypassed and its address is assigned to it's neighbor. For example, the third driver circuit is supposed to be addressed as "ID3" but is assigned the address "ID2" and placed in the fault mode since the second driver circuit is non-operational. All subsequent driver circuits are sequentially assigned an address and placed in the fault mode.

Furthermore, the LED zone 130 of the non-operational driver circuit "Bad_noID" is driven by its neighboring driver circuit that is connected to the output pin of the non-operational driver circuit that is located above the non-operational driver circuit. For example, the LED zone 130 of the non-functional driver circuit "Bad_noID" is driven by driver circuit ID2. Since driver circuit ID2 cannot drive its LED zone 130, its neighboring driver circuit ID3 is responsible for driving the LED zone 130 of driver circuit ID2. Similarly, since driver circuit ID3 cannot drive its LED zone 130, the redundant driver circuit ID3 is responsible for driving the LED zone 130 of driver circuit ID3.

Figure 10:
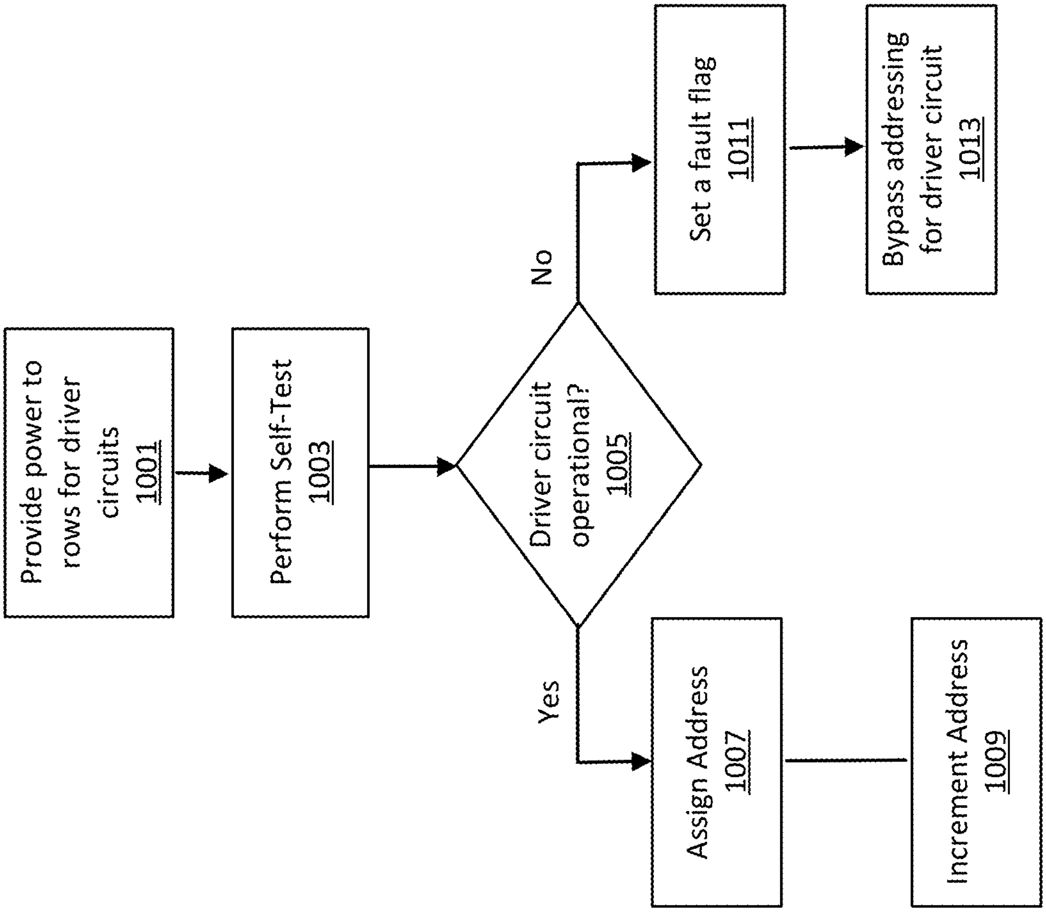
FIG. 10 is a method flow diagram of an addressing scheme for the column based redundancy scheme according to one embodiment.

FIG. 10 illustrates a method flow diagram of an addressing phase that automatically tests each driver circuit of the display system 900 shown in FIG. 9 and bypasses non-operational driver circuits. In other embodiments, other steps than those shown in FIG. 10 may be performed.

In FIG. 10, during the addressing phase, the power supply circuit 907 may provide power 1001 to rows of driver circuits 901 connected to a single power supply line (e.g., Pwr1) and does not provide power to all other rows of driver circuits 901 thereby disabling the other rows of driver circuits 901. The addressing circuit 909 sends a query via the data input lines Di (e.g., Di1 and Di2) connected to the data input pin (Di) of the driver circuits 901 that are enabled. The enabled driver circuits 901 performs 1003 a self test as previously described above to determine whether the driver circuits 901 are operational or non-operational. If the driver circuits 901 are operational, the driver circuits 901 are placed in the normal mode and output signals to the data output lines Do (e.g., Do1 and Do2) alerting the addressing circuit 909 the driver circuits 901 are operational. The addressing circuit 909 determines 1005 that the driver circuits 901 are operational based on the received output signals.

After operation of the driver circuits in a given row are verified, addressing circuit 909 assign 1007 an address and sends address commands to data input lines (e.g., Di1 and Di2) assigning the address to the driver circuits 901 that are determined to be functional. For example, the first driver circuits in each group of driver circuits are assigned the address ID_1. The addressing circuit 909 then increments 1009 the address count for assignment to the next row of driver circuits 901.

However, if the addressing circuit 909 determines that a driver circuit 1005 is non-operational due to the driver circuit 901 failing the self-test, the addressing circuit 909 sets 1011 a fault flag for the group of driver circuits that includes the non-operational driver circuit. The addressing circuit 909 bypasses 1013 addressing for the non-operational driver circuit. That is, the addressing circuit 909 does not assign an address to the non-operational driver circuit 901 and refrains from incrementing the address count. As a result, an operational driver circuit 901 in a subsequent row of driver circuits is assigned the address originally intended for the non-operational circuit. Then, the rest of the driver circuits in the row are tested.

For example, in FIG. 9 the second driver circuit 901 included in the right column (e.g., connected to data input line Di2) is found to be non-operational. Normally, the third driver circuit in the row subsequent to the row that includes the non-operational driver circuit (e.g., the third row) would be assigned the address ID_3, but since the "fault flag" is set for this column the third driver circuit is instead assigned the ID__2 address (one number lower than what it would normally be).

The method shown in FIG. 10 repeats for the next rows, each row being sequentially energized then de-energized when the row is successfully completed. When the method reaches the top row, the redundant driver circuit 903 in the left column remains unused since all driver circuits 901 in the left column are functional. However, the redundant driver circuit 903 in the right column is utilized given the right column has a non-operational driver circuit. The redundant driver circuit 903 is addressed (e.g., ID_4) and its auxiliary pin is used to drive the topmost LED zone 130 in the right column.

Some embodiments support one non-operating LED driver per column by including a single extra driver. However the concept can be extended to placing redundant driver circuits 903 at multiple positions within the LED matrix so that more than one non-functioning driver circuit could be replaced per column. For instance a redundant driver circuit 903 might be placed for every 10 driver circuits 901 in a column. As the addresses are assigned, the "non-functional" flag resets as the address-assigning procedure crossed from one group of 10 driver circuits in a column to the next 10 LED drivers in the same column.

Upon reading this disclosure, those of skill in the art will appreciate still additional alternative embodiments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the scope described herein.

The invention claimed is:

1. A display device comprising:

an array of light emitting diode zones each comprising one or more light emitting diodes that generate light in response to respective driver currents;

a control circuit to generate driver control signals and address signals; and a group of driver circuits including a plurality of driver circuits, each driver circuit in the group configured to provide a driver current of one or more light emitting diodes included in a respective light emitting diode zone from the array of light emitting zones responsive to all of the plurality of driver circuits operating in a first mode;

wherein responsive to a first driver circuit from the plurality of driver circuits having a fault condition, an output pin of the first driver circuit that is connected to a first light emitting diode zone from the array is disabled and a second driver circuit included in the plurality of driver circuits is switched to a second mode during which an output pin of the second driver circuit that is connected to a second light emitting diode zone from the array is disabled and an auxiliary output pin of the second driver circuit that is connected to the first light emitting diode zone is enabled to provide the driver current of the one or more light emitting diodes included in the faulty first driver circuit's first light emitting diode zone via the auxiliary output pin of the second driver circuit.

2. The display device of claim 1, further comprising a redundant driver circuit, wherein the redundant driver circuit is disabled responsive to all of the plurality of driver circuits operating in the first mode, and is enabled to drive one of the light emitting zones responsive to the first driver circuit having the fault condition.

3. The display device of claim 1, wherein responsive to the first driver circuit having the fault condition, each remaining driver circuit from the plurality of driver circuits that is subsequent to the first driver having the fault condition is switched from the first mode to a second mode during which each remaining driver circuit is reconfigured to provide a driver current of a light emitting diode included in a light emitting diode zone of a previous driver circuit.

4. The display device of claim 3, wherein each of the plurality of driver circuits comprises a set of pins including:

a data input pin coupled to a data output pin of a previous driver circuit in the group;

a data output pin coupled to a data input pin of a next driver circuit in the group;

an output pin coupled to a corresponding light emitting diode zone to control providing of the driver current of the light emitting diode included in the corresponding light emitting diode zone during the first mode, or disabled during the second mode;

an auxiliary pin that is disabled during the first mode or coupled to an output pin of the previous driver circuit in the group and the previous driver circuit's light emitting diode zone during the second mode;

an alternate data input pin coupled to a data input pin of the previous driver circuit in the group of driver circuits; and a ground pin coupled to ground.

5. The display device of claim 4, wherein each of the plurality of driver circuits further comprises:

a control logic to detect a fault condition that is indicative that the respective driver circuit is faulty such that the respective driver circuit is incapable of providing the driver current of the light emitting diode included in its respective light emitting diode zone, and to disable the respective driver circuit based on the detected fault condition.

6. The display device of claim 5, wherein the control logic disables the faulty driver circuit by disabling a plurality of pins included in the set of pins of the faulty driver circuit, the plurality of pins including the auxiliary pin and the output pin of the faulty driver circuit.

7. The display device of claim 6, each of the plurality of driver circuits further comprises:

a first transistor connected to the auxiliary pin; and a second transistor connected to the output pin;

wherein the control logic is configured to disable the plurality of pins by disabling the first transistor and the second transistor included in the first driver circuit.

8. The display device of claim 5, wherein the control logic is configured to detect the fault condition based on the control signals or based on a magnitude of a supply voltage generated internally within the respective driver circuit.

9. The display device of claim 4, wherein the second driver circuit is reconfigured to drive the faulty driver circuit's respective light emitting diode zone by disabling the output pin of the second driver circuit and enabling the auxiliary pin of the second driver circuit, the enabled auxiliary pin connected to the light emitting diode zone of the faulty driver circuit.

10. The display device of claim 5, further comprising:

a set of serial communication lines coupled between the data output pin and the data input pin of adjacent driver circuits from the plurality of driver circuits and coupled to the control circuit in a serial communication chain; and a set of bypass communication lines coupled between the data input pin and the alternate data input pin of adjacent driver circuits from the plurality of driver circuits;

wherein the control circuit is configured to provide the address signals through the serial communication chain but not through the set of bypass communication lines responsive to all of the plurality of driver circuits being in the first mode, or provides the address signals through a combination of the serial communication channel and at least one bypass communication line from the set of bypass communication lines responsive to at least one of the plurality of driver circuits having the fault condition.

11. The display device of claim 10, wherein each of the plurality of driver circuits is configured to determine that a previous driver circuit in the group has the fault condition responsive to the address signal of the driver circuit being received at its alternate data input pin via the set of bypass communication lines rather than at both the data input pin and the alternate data input pin.

12. The display device of claim 11, wherein each of the plurality of first driver circuits is configured to transmit a flag to a next driver circuit in the group instructing the next driver circuit to switch to the second mode responsive to the first driver circuit having the fault condition.

13. The display device of claim 4, wherein the set of pins further includes a power line communication input pin to receive a power line communication signal comprising a supply voltage modulated to encode the driver control signals for controlling the group of driver circuits.

14. The display device of claim 1, wherein the group of driver circuits is distributed in a display area of the display device.

15. The display device of claim 13, wherein the one or more light emitting diodes in a light emitting diode zone and the respective driver circuit that provides driver current of the one or more light emitting diodes in the light emitting diode zone are integrated and vertically stacked over a substrate of the display device.

16. A driver circuit for a display device comprising:

a control logic to operate in a first mode responsive to all previous driver circuits in a group of driver circuits operating in the first mode, or operate in a second mode responsive to a previous driver circuit in the group having a fault condition, wherein in the first mode the driver circuit is configured to provide a first driver current of a first light emitting diode included in a first light emitting diode zone included in an array of light emitting diode zones, the first driver current provided via an output pin of the driver circuit that is connected to the first light emitting diode zone, and wherein in the second mode the driver circuit is reconfigured by disabling the output pin of the driver circuit that is connected to the first light emitting diode zone and enabling an auxiliary output pin of the driver circuit that is connected to a second light emitting diode zone that is adjacent to the first light emitting diode zone in the array, a second driver current of a second light emitting diode included in the second light emitting diode zone provided via the auxiliary output pin.

17. The driver circuit of claim 16, further comprising a plurality of pins including:

a data input pin configured to be coupled to a data output pin of a previous driver circuit in the group;

a data output pin configured to be coupled to a data input pin of a next driver circuit in the group;

an alternate data input pin is configured to be coupled to a data input pin of the previous driver circuit in the group; and a ground pin configured to be coupled to ground.

18. The driver circuit of claim 17, further comprising:

a first transistor connected to the auxiliary pin; and a second transistor connected to the output pin, wherein the control logic is configured to disable the first transistor and enable the second transistor during the first mode, and to disable the second transistor and enable the first transistor during the second mode.

19. The driver circuit of claim 18, wherein the control logic is further configured to detect a fault condition that is indicative that the driver circuit is faulty such that the driver circuit is incapable of driving the first light emitting diode, and to disable the driver circuit based on the detected fault condition.

20. The driver circuit of claim 18, wherein the control logic disables the faulty driver circuit by disabling one or more of the plurality of pins.

21. The driver circuit of claim 20, wherein the control logic is further configured to disable the auxiliary pin and the output pin by respectively disabling the first transistor and the second transistor.

* * * * *